July 13, 1937.  R. H. GEORGE  2,086,546
OSCILLOGRAPH
Filed Sept. 14, 1929  8 Sheets-Sheet 2
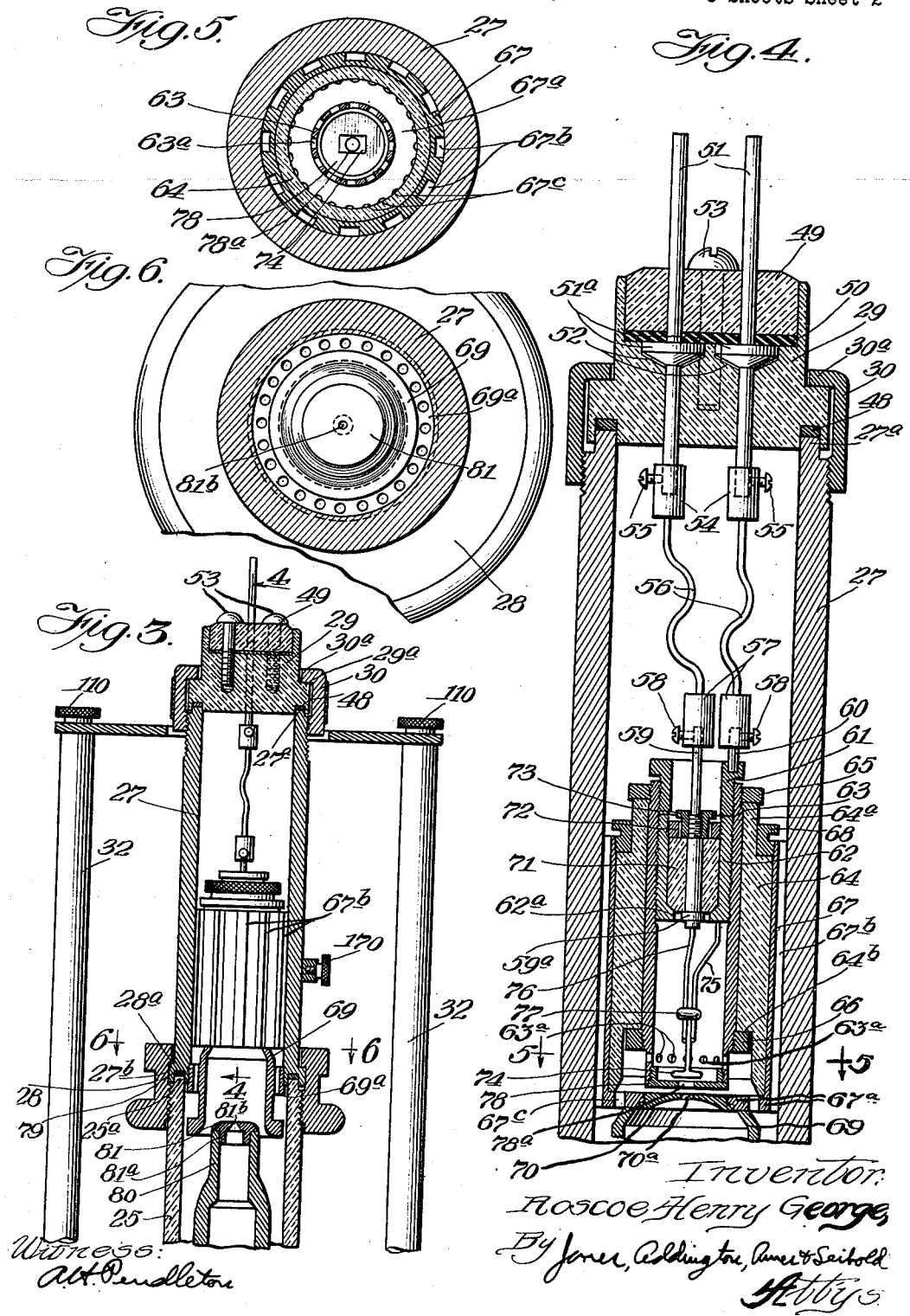
Witness:
A. H. Pendleton
Inventor:
Roscoe Henry George
By Jones, Addington, Ames & Seibold
Attys

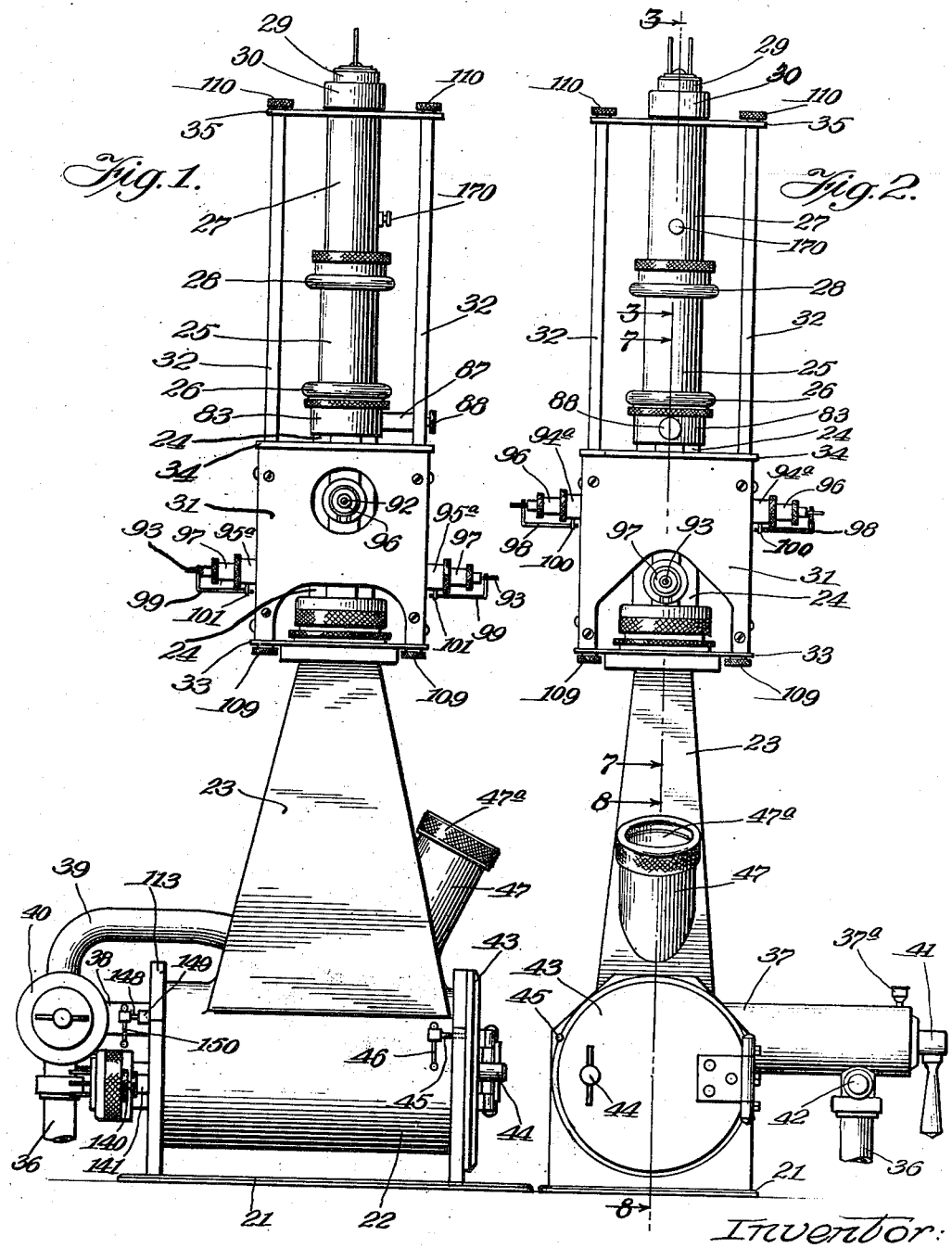

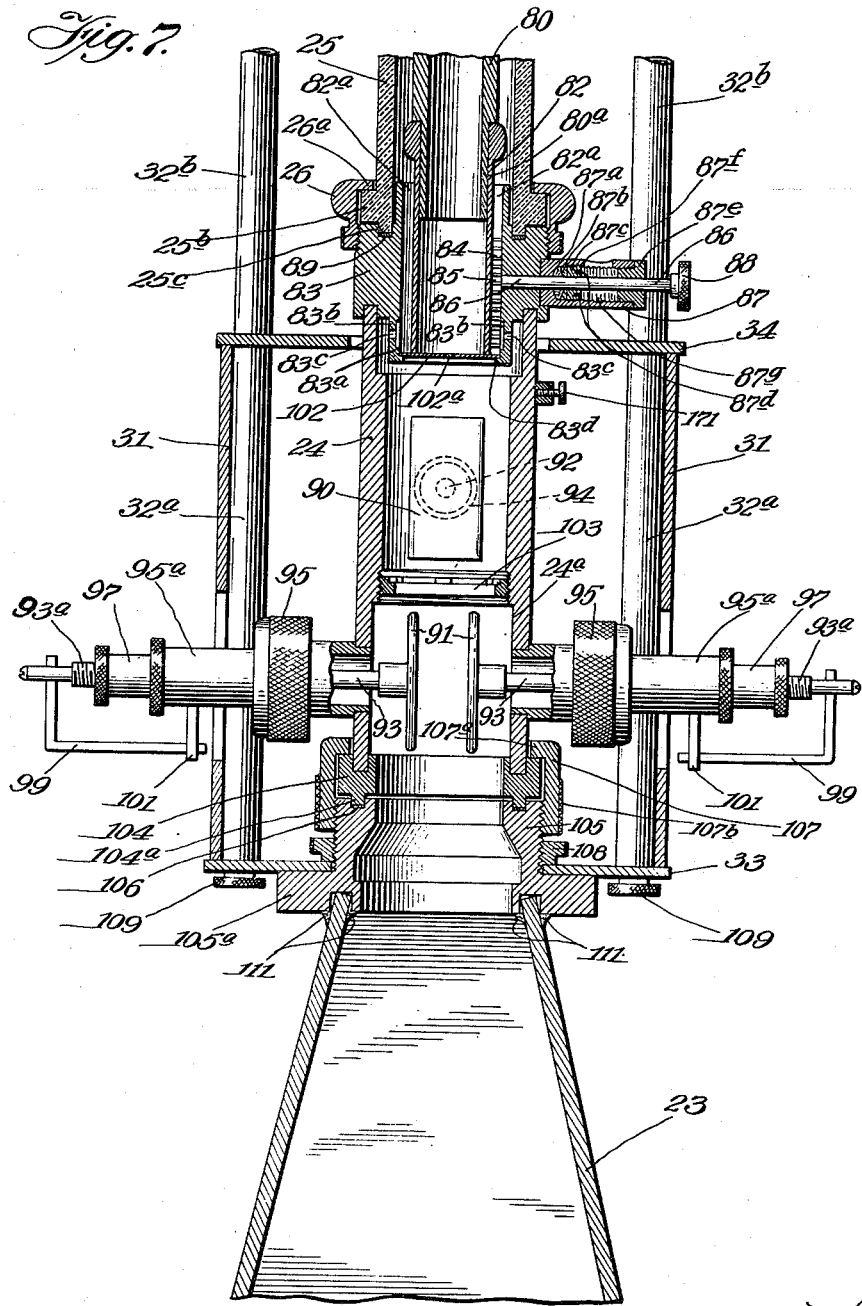

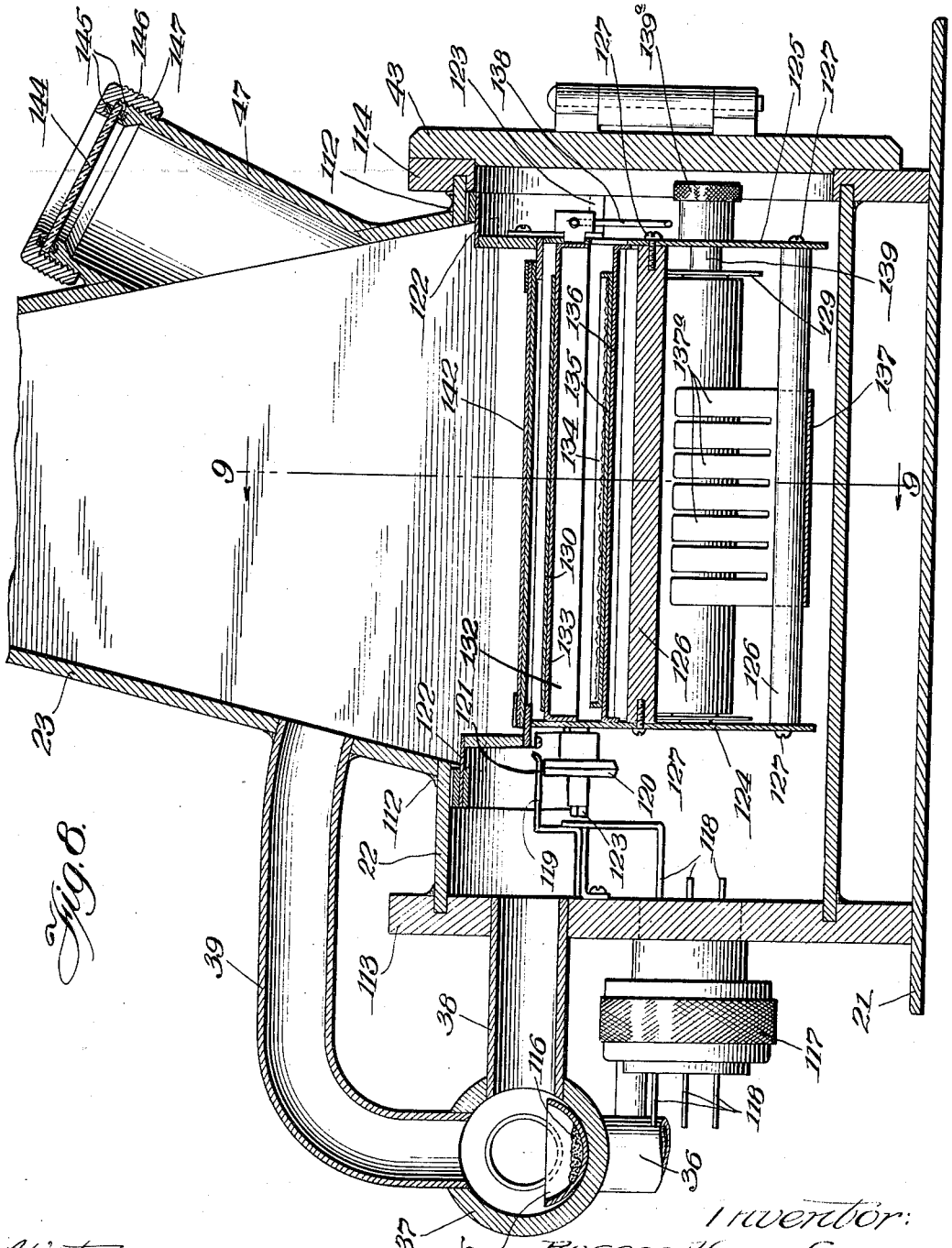

July 13, 1937.    R. H. GEORGE    2,086,546
OSCILLOGRAPH
Filed Sept. 14, 1929    8 Sheets-Sheet 5
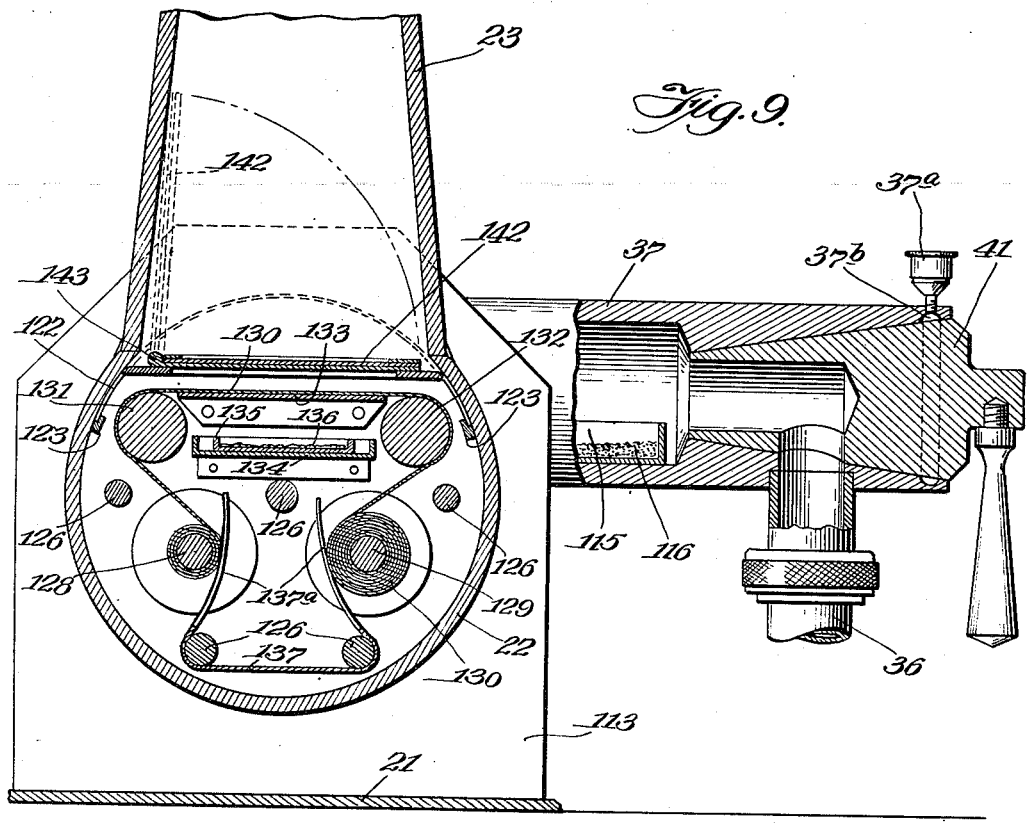
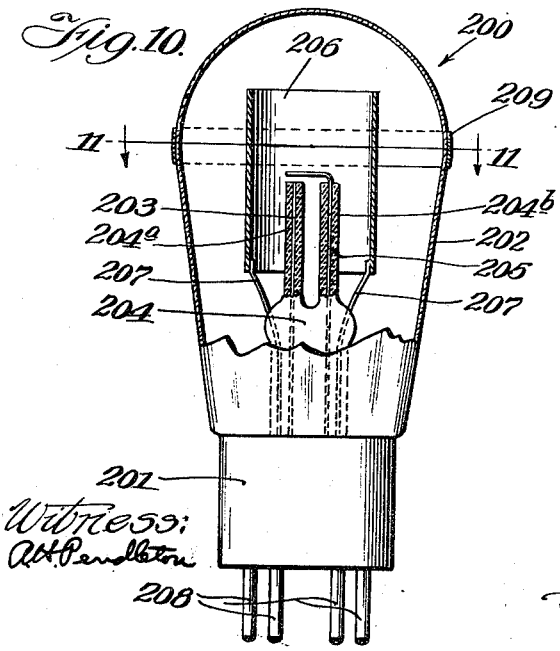
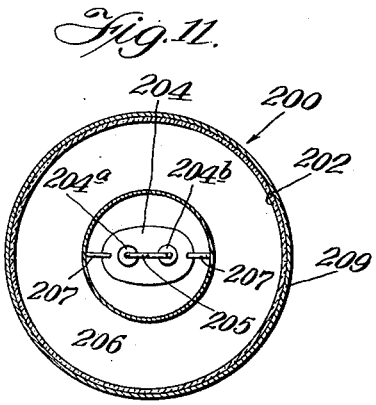
Inventor:
Roscoe Henry George,
By Jones, Addington, Ames & Seibold
Attys.

July 13, 1937.  R. H. GEORGE  2,086,546
OSCILLOGRAPH
Filed Sept. 14, 1929  8 Sheets-Sheet 6

Inventor:
Roscoe Henry George,
By Jones, Addington, Ames & Seibold
Attys.

Witness:
A. H. Pendleton

July 13, 1937.   R. H. GEORGE   2,086,546
OSCILLOGRAPH
Filed Sept. 14, 1929   8 Sheets-Sheet 7

Inventor:
Roscoe Henry George,
By Jones, Addington, Ames & Seibold
Attys.

July 13, 1937.  R. H. GEORGE  2,086,546
OSCILLOGRAPH
Filed Sept. 14, 1929  8 Sheets-Sheet 8

Inventor:
Roscoe Henry George,
By Jones, Addington, Ames & Seibold
Attys.

Witness:
A. H. Pendleton

Patented July 13, 1937

2,086,546

UNITED STATES PATENT OFFICE 2,086,546

OSCILLOGRAPH

Roscoe Henry George, West Lafayette, Ind., assignor, by mesne assignments, to Radio Corporation of America, a corporation of Delaware Application September 14, 1929, Serial No. 392,591

36 Claims. (Cl. 250—27.5)

This invention relates to oscillographs and methods of operating the same and has particular relation to cathode-ray oscillographs and systems of electrical connections therefor, whereby transient electrical phenomena and the like may be accurately and efficiently recorded or observed.

A very urgent demand for further knowledge of lightning and other transient phenomena, and other high-frequency electrical phenomena in general, has resulted in the development of three general types of cathode-ray oscillographs for such investigations. These types are the high-voltage cold-cathode type, the low-voltage hot cathode type and the medium-voltage hot-cathode type.

The cold-cathode type of oscillograph employs a gaseous discharge which requires from 30,000 to 90,000 volts to produce the cathode ray or beam. Because of the high velocity and resultant penetrating power of the electrons constituting the beam, this type of instrument has a high sensitivity with respect to the photographic recording of the movements of the cathode ray or beam, but has a low sensitivity with respect to the deflection of the beam to produce the movement thereof indicating the characteristics of the phenomena to be recorded or observed. It is also difficult to control the intense discharge of this type of instrument for more than a fraction of a second, and, therefore, instruments of this type are best adapted for recording phenomena of very short duration only. The cathode ray or beam is also quite sensitive to gas pressure, and is slow to get into operation, which is a material factor in the recording of lighting surges, for example, the time of occurrence of which cannot be predetermined.

The low-voltage hot-cathode type of instrument, utilizing 300 to 1,000 volts in its operation, has the advantage that the cathode ray or beam can be focused to a well-defined spot of high intensity on the photographic plate or viewing screen. The beam is also very sensitive to deflecting fields and may be maintained for an indefinite period of time. This type of instrument has the disadvantage, however, that its photographic sensitivity for recording purposes is extremely low.

The medium-voltage hot-cathode type of oscillograph, operated on voltages of the magnitude of 1,000 to 20,000 volts, has the advantages of increased photographic sensitivity and in the fact that the beam may be maintained continuously. The inherent decrease in deflectional sensitivity caused by the increase in voltage necessitates the employment of special means for focusing the beam and for creating the deflecting fields in its path of travel. Other difficulties which have been heretofore encountered in the utilization of this type of instrument are the removal of the oxide coat from the hot cathode or filament by positive-ion bombardment and the formation of a gas discharge which produces a large beam surrounding the main beam or cathode ray.

The primary object of the present invention is to produce a general-purpose cathode-ray oscillograph of the hot-cathode type, which may have sufficient flexibility to be operated over a wide range of voltages and which may still produce an intense, well-focused beam of high photographic and deflectional sensitivity, combining, as far as possible, the desirable qualities of previous types of such instruments without detracting from the simplicity and reliability of operation heretofore attained.

It is also an object of the present invention to produce an instrument of the above-indicated character that will be robust and reliable in order that it may be readily adaptable for portable use without affecting the accuracy and efficiency of its operation.

A further object of the invention is to provide an instrument of the above-indicated character and systems for controlling the operation of the same, whereby phenomena of extremely short duration and occurring at times which cannot be predicted may be automatically, fully, and accurately observed or recorded.

The oscillograph constituting the invention has been designed and developed with a particular view to gaining the necessary photographic sensitivity through the use of a high-intensity cathode ray or beam at a minimum beam voltage. One of the principal problems, then, has been to devise satisfactory means for producing and focusing a high-intensity beam over a sufficient range of beam voltages to insure the necessary photographic sensitivity. The solution of this problem constitutes one of the major advantages of the invention.

Other objects and advantages of the invention will appear from a consideration of the following detailed description in conjunction with the accompanying drawings illustrating a preferred embodiment of the invention. In these drawings:

Figure 1 is a side elevational view of an assembled instrument constructed in accordance with the invention;

Fig. 2 is a front elevational view of the instrument shown in Fig. 1;

Fig. 3 is an enlarged fragmentary vertical sectional view taken on the line 3—3 of Fig. 2;

Fig. 4 is a still further enlarged fragmentary vertical sectional view taken on the line 4—4 of Fig. 3;

Fig. 5 is a horizontal sectional view taken on the line 5—5 of Fig. 4;

Fig. 6 is an enlarged horizontal sectional view taken on the line 6—6 of Fig. 3;

Fig. 7 is an enlarged fragmentary vertical sectional view taken on the line 7—7 of Fig. 2;

Fig. 8 is an enlarged fragmentary vertical sectional view taken on the line 8—8 of Fig. 2;

Fig. 9 is a fragmentary vertical sectional view taken on the line 9—9 of Fig. 8;

Fig. 10 is a view, partly in side elevation and partly in central vertical section, of a particular type of electron tube that is preferably utilized in automatically controlling certain circuits for imparting a timing motion to a cathode ray or beam in an oscillograph constructed in accordance with the present invention;

Fig. 11 is a horizontal sectional view taken on the line 11—11 of Fig. 10;

Fig. 12 is a diagrammatic view showing certain parts of the instrument considerably enlarged in vertical section on the same line as that on which Fig. 4 is taken and illustrating the nature of an electrostatic field established between certain of the parts for a purpose hereinafter specified;

Figure 12:
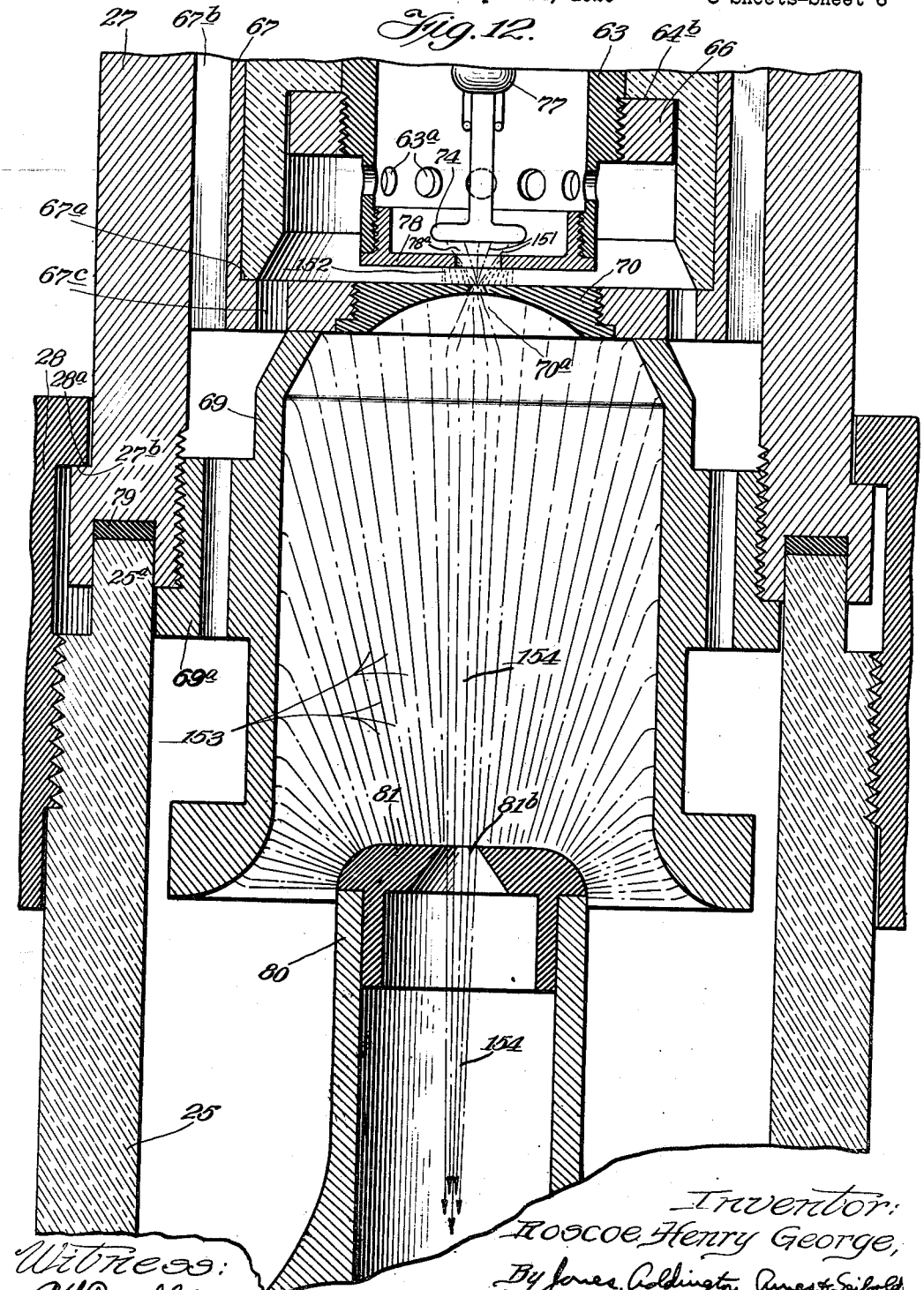

The general elements of construction of the preferred embodiment of the invention are best shown in Figs. 1 and 2 of the drawings, in which it may be seen that a base plate 21 supports a horizontally extending cylindrical chamber 22. From the upper portion of the chamber 22 a tapered casing portion 23 extends upwardly to support a vertically extending casing portion 24, the exterior of which is shown as being octagonal in cross section. To the upper extremity of the casing portion 24, a cylindrical casing portion 25 of insulating material is secured by means of a sleeve nut 26, and to the upper extremity of this casing portion 25 another cylindrical casing portion 27 is, in turn, secured by means of a sleeve nut 28. The upper extremity of this casing portion 27 is closed by an insulating cap member 29 that is secured in position by a sleeve nut 30.

The casing portions 24 and 27 are of metal and are adapted to have relatively high potential conductors connected thereto, and for this reason it is desirable to surround the same by protective members, such as insulating side plates 31 and vertical rods 32, which latter are partly of metal and partly of insulating material, as will appear hereinafter. These side plates and rods are supported by a metallic bottom plate 33, a metallic intermediate plate 34 and a top plate 35 of insulating material, which plates are supported upon the main casing of the instrument in a manner which will be better understood upon reference to the detailed drawings and description thereof hereinafter.

The entire casing of the apparatus is adapted to be evacuated to facilitate the desired operation of the instrument and for this purpose a connection 36 is provided to extend to a suitable vacuum pump. The connection 36 is connected to the casing portions 22 and 23 through a drying chamber 37 and two pipe or conduit sections 38 and 39. One end of the drying chamber 37 is provided with a removable cap 40 to permit the insertion of a container of drying material, such as a suitable hygroscopic chemical or the like, and the opposite end of this chamber is provided with a valve 41 for controlling the connection of the instrument casing to the vacuum pump through the connection 36. The latter connection preferably includes a second valve 42 for connecting the interior of the instrument casing to the atmosphere in order to break the vacuum within said casing when desired.

One end of the cylindrical portion 22 of the casing is provided with a hinged door 43 adapted to be tightly sealed by a suitable gasket or otherwise and to be opened by means of a handle 44. Since this door is held very tightly closed by the external atmospheric pressure when the interior of the casing is evacuated, it is also desirable to provide a releasing screw 45, which extends through a screw threaded hole in a projecting portion of the end wall of the casing portion 22 and abuts against the inner surface of the door 43 near the periphery thereof. A pin 46 extends through a hole in the head of the screw 45, in order that this screw may be turned manually to effect a slight opening of the door 43 when the vacuum within the casing has been broken. When the door 43 is thus moved a slight distance it may be readily opened by means of the handle 44.

A tubular member 47 is secured to one side of the tapered casing portion 23 and extends angularly therefrom in such direction that a viewing screen within the cylindrical casing portion 22 may be observed through a suitable window in the outer extremity of said tubular member. The structural details of such viewing screen and observing window will appear hereinafter. It may be noted here, however, that a cover 47a prevents light from entering the casing through said window when the latter is not in use.

Referring now to Figs. 3, 4, 5, and 6, it will be seen that the uppermost cylindrical casing portion 27, which is preferably of brass or other suitable metal, is externally screw threaded near its upper extremity to receive the internally screw threaded portion of the flanged sleeve 30. The upper portion of this sleeve comprises an inwardly extending flanged portion 30a, which extends over a shoulder portion 29a of the insulating cap member 29. The bottom surface of the cap member 29 is provided with an annular groove fitting over a reduced diameter portion 27a of the metallic casing portion 27 at the upper extremity thereof. An annular washer or gasket 48 is disposed within the annular groove in the bottom of the cap member 29 and is forced firmly against the top surface of the reduced diameter portion 27a by the firm application of the flanged sleeve 30 to the threaded portion of the member 27. The washer or gasket 48 is preferably made of rubber and with the construction disclosed forms a perfectly air-tight connection between the casing portion 27 and the cap member 29 to facilitate the evacuation of the casing.

The upper portion of the cap member 29 is bored to receive a plug member 49 that is also of insulating material in snugly fitting relation. A rubber gasket 50 is placed beneath the plug member 49 and both the plug member and the gasket are perforated to accommodate two conducting rods 51 which extend downwardly through the cap member 29 as well as upwardly through the plug member 49, the cap member 29 being similarly perforated for this purpose.

The rods 51 are provided with integral collar portions 51a about midway of their length, and these collar portions are disposed within counterbores in the cap member 29. The under faces of the collar portions 51a are tapered to produce a frusto-conical surface corresponding to the angle of inclination of the bottoms of the counterbores in the cap member 29 and rubber gaskets 52 are disposed between the bottoms of the collar portions 51a and the bottom surfaces of these counterbores.

The plug member 49, the gasket 50, the conductors 51, and the gaskets 52 are maintained in assembled relation, as shown, by machine screws 53 extending through suitable holes in the plug member 49 and entering suitable threaded openings in the plug member 29. These screws are screwed tightly into position to hold the parts in firm engagement with each other whereby the rubber gaskets form an air-tight seal for the interior of the casing.

The lower extremities of the conductors 51 have connecting sleeves 54 suitably secured thereto, as by set-screws 55, and flexible conducting leads 56 are respectively soldered to or otherwise suitably electrically connected with the sleeves 54. The lower extremities of the flexible leads 56 are similarly connected to two connecting sleeves 57 which, in turn, are respectively secured by set-screws 58 to conductor rods 59 and 60. The rod 60 is soldered or otherwise suitably connected to a metallic locking sleeve 61 that is provided with external screw threads, as is also a metallic sleeve 62, to cooperate with corresponding internal screw threads in another metallic sleeve 63. The sleeve 63 is suitably secured within an insulating bushing 64 by means of nuts 65 and 66 respectively engaging external screw threads at the upper and lower extremities of said sleeve, and the sleeve 62 is adapted to be adjusted to any desired vertical position with respect to the sleeve 63 by reason of its screw-threaded engagement therewith, and to be locked in the desired position by means of the locking sleeve 61, which thus acts as a lock-nut.

The nut 65 engages the top of a reduced-diameter portion 64a of the insulating bushing 64, while the nut 66 engages a shoulder 64b formed by an enlarged bore in the lower portion of said bushing. It will be seen that the vertical position of the sleeve 63 and parts carried thereby, with respect to the insulating bushing 64, may be adjusted by varying the positions of the nuts 65 and 66 on the screw-threaded portions of said sleeve.

The insulating bushing 64, in turn, is supported by a tubular metallic sleeve member 67 having a free sliding fit with respect to the interior of the tubular casing portion 27. The bushing 64 fits snugly within the bore of the sleeve 67 and its lower extremity rests upon a shoulder formed by an inwardly extending flange or bottom portion 67a of the sleeve 67. An annular securing nut 68 surrounds the reduced-diameter portion 64a at the top of the bushing 64 and is provided with external screw threads cooperating with internal screw threads in the upper portion of the bore of the sleeve 67. By screwing the nut 68 firmly into the upper extremity of the sleeve 67, the bottom of this nut is caused to force the bushing 64 firmly down against the inwardly extending shoulder portion 67a of the sleeve 67 and the bushing 64 is thus firmly secured within the metallic sleeve 67.

The outer surface of the metallic sleeve 67 is provided with a plurality of longitudinally extending slots or grooves 67b to form a direct path for the passage of air between the portions of the casing 27 above and below the sleeve 67 and parts carried thereby. The sleeve 67 is thus provided with ample bearing surface for sliding movement within the casing portion 27 during insertion and removal of said sleeve, without obstructing the passage of gases between the different parts of the casing.

The bottom portion 67a of the sleeve 67 rests upon the top of a substantially bell-shaped but open-topped metallic member 69 as a support. The member 69 comprises a perforated integral collar portion 69a that is externally screw-threaded for the purpose of securing the same within the lower extremity of the casing portion 27, which is internally screw-threaded to receive the same. The perforations in the collar portion 69a of the member 69 are provided for the same purpose as the grooves 67b in the outer surface of the metallic sleeve 67, that is, to permit the free passage of gases between the various portions of the interior of the casing. The bottom portion 67a of the sleeve 67 is likewise perforated, as at 67c, to connect the open space within the sleeve with the remainder of the casing.

The bottom of the sleeve 67 is closed by a plate or disc 70 having a tapered central aperture 70a therein for a purpose hereinafter specified. While the bottom wall of the casing 67 may, if desired, be integrally formed and perforated at 67c and 70a, it is preferable that provision be made for accommodating removable plates or discs 70 as shown, in order that such plates or discs having apertures 70a of different sizes or formations may be interchangeably utilized to obtain the best possible results in operation of the instrument.

An insulating bushing 71 is secured within the bore of the metallic sleeve 62 by means of an externally screw threaded annular nut 72 cooperating with corresponding screw threads on the inside of the bore of the sleeve 62. The bottom of the bushing 71 is beveled to bear against a similarly beveled inwardly extending flange portion 62a of the sleeve 62 whereby the bottom of the bushing 71 is supported. The bushing 71 supports the conductor rod 59 which extends in snugly fitting relation through the bore of said bushing and which is provided with an integral collar portion 59a bearing against the bottom of said bushing.

The portion of the conductor 59 immediately above the upper surface of the bushing 71 is screw-threaded to cooperate with an internally screw-threaded nut 73 which extends within the bore of the annular securing nut 72 and in spaced relation thereto. The bottom of the securing nut 73 thus bears against the top of the bushing 71 and when this nut is tightened it holds the conductor rod 59 securely within said bushing and in insulated relation to the metallic sleeves 61, 62 and 63.

A ribbon-type filament 74 is supported within the metallic sleeve 63 and near the lower extremity thereof by two lead wires 75 and 76 to which the opposite extremities of said filament are respectively connected and which, in turn, are respectively connected to the metallic sleeve 62 and the conductor rod 59. The lead wires 75 and 76 are preferably supported with respect to each other by a glass bead 77 near the lower extremity of said lead wires.

It will be seen that the ends of the filament 74 are respectively connected, through the several members described, with the two conductor rods 61 extending upwardly through the cap member 29 of the casing, and that the end of the filament which is connected to the lead wire 75 is electrically connected to the metallic sleeve 63 through the sleeve 62. It is preferable in some cases to have both of the filament leads insulated from the sleeve 63, in which case it will be readily understood that the conductor 60, instead of being connected to the sleeve 62 as shown, will extend downwardly through the insulating bushing 71 in a manner similar to that in which the conductor 59 so extends, as herein shown and described.

The bottom of the sleeve 63 is internally screw-threaded to receive a similarly screw-threaded cap member 78 having a central aperture 78a therein in alignment with the aperture 70a in the plate or disc 70 closing the bottom of the sleeve 67. These two apertures are also in alignment with the filament 74 (which, however, is wider than said apertures), and are provided to permit the passage of electrons emitted from said filament in the desired downward direction. This filament is preferably provided with an oxide coating to facilitate such electron emission in a manner well known in the art. This oxide coating is preferably applied to the filament on the bottom surface only thereof, since it is desired that electrons be emitted only in a downward direction. It is for the purpose of preventing the emission of electrons in other directions that the filament is enclosed by the metallic sleeve 63 and the cap closure 78, which constitute an effective filament shield.

The lower portion of the sleeve 63 is perforated, as at 63a, to facilitate the complete evacuation of the open space within said sleeve, thus insuring the complete removal of any gases that may be given off by the filament 74 when it is heated. Since the insulating bushing 64 extends downwardly around the lower extremity of the sleeve 63 for a substantial distance below the level of the perforations 63a, the emission of electrons through these perforations is substantially prevented.

It will be noted that the filament 74, its shield 63 and the plate or disc 70 constituting the top of the negative electrode 69 are assembled into a compact unit carried by the sleeve 67, which unit is readily removable from and replaceable in the casing portion 27 and which simply rests upon the top of the member 69. The only connections to this unit are made through the flexible conducting leads 56, which are readily detachable when it is desired to remove or replace the unit. This unit is designated as the "electron gun", because it comprises the means for establishing the cathode ray or electron stream and for initially focusing and accelerating the same. This initial focusing and accelerating effect can be regulated as desired by adjusting the spacing between the filament 74 and the plate 78 and between the plate 78 and the plate 70, or the bottom of the member 67.

The lower extremity of the casing portion 27 comprises an integral collar portion 27b that is adapted to be engaged by an inwardly extending flange portion 28a of the securing sleeve 28. An annular groove is provided in the bottom edge of the casing portion 27 and a reduced diameter portion 25a of the insulating casing portion 25 extends in snugly fitting relation into this groove and abuts against a rubber gasket or washer 79 to form an air-tight connection between the casing portions 25 and 27. These two casing portions are securely held in their respective positions by the securing sleeve 28, which is internally screw-threaded to cooperate with corresponding external screw-threads at the upper extremity of the casing portion 25.

As will hereinafter appear, the bell-shaped metallic member 69 constitutes a negative electrode for the establishment of an electrostatic field in the path of travel of the electrons emitted from the filament 74. A cooperating positive electrode is provided in the form of a hollow cylindrical member 80, the upper extremity of which is of substantially smaller diameter than the internal diameter of the member 69. The upper extremity of the positive electrode 80 is closed by a metallic cap member 81 having an annular protruding portion 81a on the bottom thereof fitting snugly within the bore of the electrode 80. The cap member 81 has a central aperture 81b therethrough in vertical alignment with the apertures 70a and 78a and the filament 74 to accommodate the electron jet or beam emitted downwardly from the filament 74. The aperture 81b is enlarged conically in a downward direction, as shown, thus forming a sharp edge at the top of the member 81 and preventing reflection of electrons from the walls of said aperture.

Referring now to Fig. 7, it will be seen that the positive electrode 80 is supported by a tubular member 82 into which a reduced-diameter portion 80a at the lower extremity of said electrode 80 snugly fits, the shoulder formed by the upper extremity of this reduced diameter portion resting upon the top of the tubular member 82. The member 82 is slidably fitted within a tubular metallic casing portion 83 that is suitably secured to the upper extremity of the metallic casing portion 24, as by soldering, brazing, or the like. The outer surface of the tubular member 82 is provided with a plurality of longitudinal slots or grooves 82a in a similar manner and for the same purpose that the grooves 67b are provided in the outer surface of the metallic sleeve member 67 as heretofore described.

A rack 84 is provided on one side of one of the grooves 82a and is adapted to cooperate with a pinion 85 secured to or forming an integral part of a shaft 86 extending outwardly through an aperture in the tubular casing portion 83. A sealing gland or joint is provided around the shaft 86 to maintain an air-tight seal around said shaft. This gland or joint comprises a substantially cylindrical hollow casing portion 87 having its inner extremity fitted and brazed or welded into a counterbore in the outer surface of the casing portion 83, which counterbore is coaxial with the aperture in said casing portion through which the shaft 86 extends. The bore of the member 87 is restricted at the inner extremity of said member to a diameter similar to that of the aperture in the member 83, which is just large enough to permit the shaft 86 to extend therethrough in freely rotatable relation. A mass of packing material 87a is disposed within the gland casing 87 around the shaft 86 and is held in place between the opposed concave surfaces of the inner end portion of the member 87 and a packing disc or washer 87b. The inside of the bore of the member 87 is screw-threaded to receive an externally threaded plug member 87c that is centrally apertured to surround the shaft 86 in closely fitting but free running relation and that is also provided with apertures 87d for the reception of a suitable wrench or other tool for forcing the disc or washer 87b against the packing material 87a. A bushing member 87e that is also centrally apertured to receive the shaft 86 in closely fitting but free running relation comprises an externally screw-threaded reduced-diameter portion, that is screwed into the outer extremity of the gland casing 87 to provide a journal for the outer portion of the shaft 86, the casing 87 being of such length that when the parts are assembled a substantial amount of space remains between the member 87c and 87e and the casing 87 is provided with an aperture 87f on its upper side to permit this space to be filled with grease as indicated at 87g. In this manner the oscillograph casing is made completely air-tight around the shaft 86, the grease 87g supplementing the packing 87a to form a perfect seal. This type of vacuum seal is believed to be new and is claimed as a part of the invention disclosed herein.

The outer extremity of the shaft 86 is preferably provided with a knurled knob 88 which may be turned manually to adjust the vertical position of the slidable tubular member 82 and the positive electrode 80 that is carried thereby. Such manipulation of the knob 88 results in any desired change of the vertical position of the positive electrode 80 with respect to the negative electrode 69, this adjustment being provided for a purpose hereinafter explained.

The insulating casing portion 25 is secured in fixed relation to the tubular casing portion 83 by the securing sleeve 26, which comprises an inwardly extending flange portion 26a engaging the shoulder formed by an integral collar portion 25b near the lower extremity of the member 25. The lower portion of the securing sleeve 26 is internally screw-threaded to cooperate with corresponding external screw threads on the upper portion of the member 83 whereby the sleeve 26 may be screwed down to force the casing portion 25 downwardly into tight engagement with the casing portion 83. For the purpose of providing an air-tight connection at this point, the member 83 is provided on its top surface with an annular groove into which a reduced-diameter portion 25c at the bottom of the casing portion 25 extends in snugly fitting relation and is forced against a rubber gasket or washer 89 in a manner similar to that described with respect to the air-tight joint between the cap member 29 and the casing portion 27 and between the top of the casing portion 25 and the bottom of the casing portion 27.

The lower portion of the member 83 is reduced in diameter to form a downwardly extending portion 83a spaced inwardly from the inner wall of the casing portion 24 and having an annular groove 83b formed in its inner surface. A plurality of perforations 83c extend through the downwardly extending portion 83a of the member 83 to connect the interior of the casing portion 24 with the interior of the casing portion 25 through the annular groove 83b and the longitudinal grooves 82a in the outer surface of the member 82. The provision of these various grooves and perforations is also for the purpose of facilitating the evacuation of the entire open space within the several portions of the casing, as in the case of the several grooves and perforations heretofore described.

The backs of two pairs of metallic plates 90 and 91 are secured, within the casing portion 24, to the inner extremities of rods 92 and 93 respectively, the two rods supporting each pair of plates having a common axis perpendicular to the axis of the rods supporting the other pair of plates. Each of the pairs of supporting rods 92 and 93 extends outwardly through sealing glands 94 and 95, respectively, which are packed and sealed with grease as in the case of the gland 87. The inner portions of the glands 94 and 95 are preferably of brass or other suitable metal suitably fitted and secured in apertures in the walls of the metallic casing portion 24, as by soldering, brazing, or the like.

The glands 94 and 95 are constructed to insulate the rods 92 and 93 from the oscillograph casing, as well as to provide a perfectly airtight seal therearound, and for this purpose they comprise outwardly extending portions 94a and 95a, respectively, of suitable molded insulating material, or the like (see also Figs. 1 and 2), within which adjusting nuts 96 and 97, respectively, are disposed to be freely rotatable but fixed against axial sliding movement. The adjusting nuts 96 and 97 are internally screw-threaded to cooperate with external screw threads 92a and 93a on the outer portions of the rods 92 and 93, respectively, whereby the spacing between each of the pairs of plates 90 and 91 may be varied by turning the nuts 96 and 97. In order to prevent rotation of the rods 92 and 93 while the nuts 96 and 97 are being adjusted, the outer extremities of angularly bent wires 98 and 99 are secured to the outer extremities of the rods 92 and 93, respectively, and the inner extremities of these wires are secured to pins 100 and 101 carried by the outwardly extending insulating portions 94a and 95a, respectively, of the sealing and insulating glands 94 and 95.

It will appear hereinafter that the cathode ray or beam emitted from the filament 74 and accelerated downwardly through the instrument will pass between the two plates of each of the pairs of plates 90 and 91, and that these plates will be suitably electrically energized to cause the ray or beam to be deflected from its normal path. In order that only the main portion of the beam may be permitted to pass between the pairs of deflecting plates, a diaphragm 102, having a centrally located aperture 102a therein, is disposed at the lower extremity of the reduced diameter portion 83a of the member 83. This diaphragm 102 is supported upon an annular inwardly extending shoulder portion 83d at the bottom of the reduced-diameter portion 83a and cooperates therewith to limit the downward movement of the vertically slidable member 82, which abuts against the upper surface of the diaphragm 102 when it is in its lowermost position. The diaphragm 102 is preferably composed of sheet nickel and the aperture 102a therein is of such size as to permit the passage of the entire main portion of the cathode ray or beam while the portions of the diaphragm surrounding the aperture 102a intercept and cut off any stray electron emission which may be caused by a positive ion bombardment of the negative electrode 69 or other causes.

An externally screw-threaded annular member 103 is disposed at an intermediate point within the casing portion 24 between the two pairs of deflecting plates 90 and 91 and is held in position by cooperating screw threads provided in the inner surface of the casing portion 24, this casing portion being counter-bored, as at 24a, to permit the insertion of the member 103 from the bottom of said casing portion. This member 103 is provided for the purpose of supporting a metal plate (not shown) between the two sets of deflecting plates 90 and 91 where it is found necessary to utilize such a plate to prevent voltages from being induced on one pair of plates from the other. The reason for not showing this plate and describing the same more fully is that it is not required for normal operation of the instrument, although the latter, as well be seen, has been designed to accommodate such extraordinary requirements.

The lower extremity of the casing portion 24 extends into an annular groove in the upper surface of a metallic collar member 104 and is suitably secured thereto by soldering, brazing, or the like. The lower surface of the member 104 comprises a downwardly extending annular portion 104a which extends in snugly fitting relation into an annular groove in the upper surface of a member 105, which constitutes the supporting base of the upper parts of the instrument. A rubber sealing gasket 106 is placed in the bottom of the groove in the upper surface of the member 105 and the bottom of the annular projecting portion 104a of the member 104 is forced against this gasket by a securing nut 107 having an inwardly extending flange portion 107a at its upper extremity engaging the shoulder formed by the top of the collar member 104. The securing nut 107 is internally screw-threaded to cooperate with corresponding external screw threads on the member 105 and the outer surface of the member 107 is suitably knurled, as at 107b, whereby it may be firmly screwed down onto the member 105 to make an air-tight connection between the members 104 and 105, as in the case of the similar air-tight connections heretofore described.

The lower extremity of the member 105 comprises an integral outwardly extending annular flange portion 105a upon which the bottom plate 33 is adapted to rest, this plate being centrally apertured so that it may be freely passed over the screw-threaded portion of the member 105. A securing nut 108 which also screw-threadedly engages the externally screw-threaded portion of the member 105 is adapted to be screwed down against the upper surface of the plate 33 to maintain the same securely in its normal position as indicated.

It will be seen that the bottom plate 33 is thus firmly supported by the casing of the instrument and that this plate carries the insulating side plates 31 which, in turn, support the intermediate plate 34 that is centrally apertured to pass over the upper extremity of the casing portion 24. The bottom plate 33 also has secured thereto, as by securing nuts 109, the lower extremities of the rods 32, to the upper extremities of which the top insulating plate 35 is secured, as by nuts 110. Each of the rods 32 is formed in two parts suitably joined together at the level of the intermediate plate 34. The lower portion 32a of each of these rods, extending between the plates 33 and 34, is preferably of metal of square cross section, while the upper portion 32b, extending between the plates 34 and 35, is preferably of insulating material of circular cross section. The upper plate 35 is centrally apertured so that it may be passed over the sleeve nut 30 and the upper extremity of the casing portion 27. It will also be noted that the insulating side walls 31 are suitably apertured to permit the extension of the rods 92 and 93 and the adjusting means therefor to a readily accessible position outside the space enclosed by these side walls.

The bottom of the member 105 is grooved to receive the upper extremity of the tapered casing portion 23 which is also of metal and is permanently secured to the member 105 in air-tight relation by soldering or brazing, as indicated at 111.

Referring now to Figs. 8 and 9, it will be seen that the lower extremity of the tapered casing portion 23 registers with an aperture in the top of the horizontally extending cylindrical casing portion 22 and is permanently and tightly secured to said casing portion 22 by soldering or brazing, as indicated at 112.

The ends of the casing portion 22 are respectively supported by vertical end plates 113 and 114 which are suitably secured to the ends of said casing portion by soldering or brazing to form perfectly air-tight joints. The end plate 113 closes the left-hand end of the casing 22, as viewed in Fig. 8, and is apertured to receive the inner extremity of the pipe or conduit 38, the other extremity of which connects with the interior of the drying chamber 37. The pipe or conduit 39 similarly connects the drying chamber 37 with the casing portion 23, it being understood that both of the pipes or conduits 38 and 39 are brazed or soldered to the members to which they are connected at their respective extremities to form air-tight connections. The provision of the two pipes or conduits 38 and 39 insures complete and rapid evacuation of all parts of the casing without causing the air or other gases therefrom to encounter any unnecessary obstructions.

A tray or open container 115 is disposed within the drying chamber 37 and is adapted to hold a quantity of phosphorous pentoxide or other hygroscopic material 116 to prevent the passage of any moisture from the interior of the instrument (particularly from photographic films) into the pumping apparatus, where deleterious results would be caused thereby. The interior of the drying chamber 37 is connected through the valve 41, as best shown in Fig. 9, with the connection 36 which extends to the vacuum pump (not shown), as previously stated. This valve is sealed to prevent any leakage of air into the instrument at this point, by means of grease supplied by a grease cup 37a to an interior annular groove 37b near the outer extremity of the member 37 surrounding the body portion of the valve 41.

A sealing and insulating gland 117 is also connected to the end plate 113 for the purpose of permitting electrical conductors 118 to be extended from the exterior of the casing into the interior thereof in electrically insulated and air-tight relation thereto. These conductors may be utilized for making connections to vacuum indicating lamps or devices and other circuits which it may be found desirable to utilize within the casing of the instrument, particularly in the portion 22 thereof. One of the conductors 118 is shown as being connected to a contact member 119 bearing upon the periphery of a metallic disc 120 having an insert 121 of insulating material at a predetermined point therein. These parts may be utilized in connection with a film-winding mechanism, as will be more fully described hereinafter.

The end plate 114 of the chamber portion 22 is apertured to permit the insertion and removal of the above mentioned film-winding mechanism, and this aperture is adapted to be closed and tightly sealed by the hinged door 43, as previously described.

The film-winding and carrying mechanism is constructed as a removable unit adapted to be supported by a frame 122, which is constituted by a piece of sheet metal forming a portion of a cylinder and apertured substantially in register with the bottom of the casing portion 22. The frame member 122 is located at the upper portion of the film-winding and supporting mechanism and is adapted to fit within the interior of the horizontally extending cylindrical casing portion 22 and to be supported upon rabbeted or grooved longitudinal rods 123 secured to the inner surface of this portion of the casing. With this manner of support it will be seen that the film mechanism may be slid into the casing portion 22 through the opening in the end wall 114 when the door 45 is open and that this mechanism will be accurately held in the desired position for the purpose of obtaining photographic records of the movements of the cathode ray, as will appear hereinafter.

Suspended from the supporting frame 122 are two end plates 124 and 125 between which a plurality of supporting rods 126 extend. The respective extremities of the rods 126 are secured to the end plates 124 and 125 by screws 127, or other suitable means, and in this manner a rigid frame-work for the operative parts of the film mechanism is eventuated. Film-winding rolls or spools 128 and 129 are provided with suitable pintles journaled in the end plates 124 and 125 and a photographic film 130 is adapted to be wound from one of these rolls or spools onto the other in the operation of the instrument. The film extends between the two rolls or spools 128 and 129 over two idler rolls 131 and 132, which are also journaled in the end plates 124 and 125.

Between the idler rolls 131 and 132 a horizontally extending plate or table 133 is disposed for supporting an intermediate portion of the film in register with the aperture through the top of the casing portion 22 and with the bottom of the casing portion 23. This plate or table 133 is rigidly secured at its opposite extremities to the end plates 124 and 125, and thus forms a solid support for the portion of the film 130 upon which the photographic records are made. Beneath the plate or table 133 a fixed tray 134 is disposed, this tray also being rigidly secured at its opposite extremities to the end plates 124 and 125. This tray is adapted to support a removable tray 135 carrying a quantity of phosphorous pentoxide or other hygroscopic material 136 for absorbing any moisture which remains in the film 130 when the same is placed in the casing portion 22.

A resilient member 137 is supported by two of the rods 126 near the bottom of the end plates 124 and 125 and extends inwardly and upwardly past the film-winding rolls or spools 128 and 129. The upwardly extending portions of the member 137 are comb-like to form a plurality of resilient prongs or fingers 137a which bear firmly against the film 130 as it is wound upon or unwound from the rolls or spools 128 and 129. The pressure exerted upon the film 130 by these resilient prongs 137a maintains the desired degree of tautness in the portion of the film between the two rolls or spools 128 and 129.

A handle member 138 is suitably secured to the end plate 125 to facilitate insertion and removal of the film mechanism into and out of the chamber 22. The right-hand extremity of the film-winding roll or spool 129 is pivotally supported on a pintle 139 which may be maintained in its operative position as illustrated by any suitable and well known means, and which may be retracted by means of a knurled knob 139a to permit removal and replacement of the spool 129. The right-hand extremity of the spool 128 is similarly supported by a corresponding retractible pintle (not shown). The left-hand extremity of the roll or spool 128 is adapted to be engaged by suitable turning prongs or fingers (not shown) connected to a knurled knob 140 (Fig. 1), the spindle of which extends through the end wall 113 through an air-tight sealing gland 141, to permit winding of the film from the roll or spool 129 onto the roll or spool 128 from the outside of the casing of the instrument while the inside of said casing is evacuated to place the instrument in condition for operation.

By means of this mechanism, it will be understood that successive portions of the film 130 may be brought into register with the aperture in the top of the casing portion or film chamber 22, through which the cathode ray or beam enters said chamber. This operation may be performed without breaking the vacuum within the casing of the instrument, and thus a considerable number of photographic records may be made in a short time without extended intermediate delays, which would be occasioned if it were necessary to open the casing each time the film was to be changed, and therefore to reestablish the vacuum after each film change.

The purpose of providing the contact disc 120 and cooperating contact finger 119 will now appear. The disc 120 is carried by and secured to the left-hand extremity or pintle of the idler roll 132, as shown in Fig. 8, whereby this disc rotates with said idler roll. This roll is moved in unison with the movement of the film 130 by reason of the frictional engagement between the film and roll, since the intermediate portion of the film between the two winding rolls 128 and 129 is always maintained in a taut condition, as previously described. Therefore, when the film is wound from the roll 129 onto the roll 128 by manipulation of the knurled knob 140, the contact disc 120 is rotated to a degree that is exactly proportional to the distance through which any given point of the film moves. The circumference of the roll 132 is such that one complete revolution thereof corresponds to a movement of the film 130 through a distance equal to the length of film utilized at each exposure thereof.

The initial exposure setting of the film is made with the contact finger 119 in contact with the insulating insert 121 in the disc 120. When the film is moved toward the position which it is to occupy during its next exposure, the contact finger 119 contacts with the conducting portions of the disc 120 to establish an electrical circuit between one of the insulated conductors 118 and the metallic frame of the instrument. This condition may be indicated by connecting the said one of the conductors 118 and the frame of the instrument in series with a lamp or other indicating device, which may be conveniently located for that purpose, and which is not shown herein in order to avoid unnecessary complication of the drawings. When the desired movement of the film 130 has been effected, the contact finger 119 again engages the insulating insert 121 in the disc 120 and interrupts the indicating circuit, it being understood that the contact finger 119 is otherwise suitably insulated from the framework or casing of the instrument. Upon extinguishment of the lamp or corresponding indication of any other indicating device that may be utilized, the operator is informed that the film has been moved through the desired distance and that a fresh portion thereof is ready for exposure. It is also contemplated that the contact mechanism comprising the finger 119 and the disc 120 having the insulating insert 121 therein may be utilized to effect automatic operation of the film by an electric motor or other suitable means in response to any desired condition indicating that a record has been made on the exposed portion of the film and that a fresh portion of the film should be brought into the field of exposure. The essential element of this feature of the invention, however, is in associating the indicating mechanism comprising the disc 120 with an idler roll, such as the roll 132, that is rotated through a predetermined degree for any given movement of the film 130, while the degree of rotative movement of the winding rolls 128 and 129 is variable depending upon their effective circumferences, that is, depending upon the amount of film which has been wound from one of these rolls onto the other.

For the purpose of permitting visual inspection of the movements of the cathode ray or beam under the influence of the phenomena being observed, a phosphorescent or fluorescent screen 142 is hinged about a horizontal axis at 143 to a fixed portion of the frame 122 of the film mechanism. This screen is adapted to be rotated about the axis 143 between the full line and dotted line positions indicated in Fig. 9. In the dotted line position, as shown in this figure, the screen is entirely out of the path of the cathode ray or beam, which therefore impinges on the film 130 and is photographically recorded thereon. When the screen 142 occupies the position indicated in full lines in Figs. 8 and 9, it is horizontally disposed above the exposed portion of the film 130 in the path of the cathode ray or beam, and the upper surface thereof may be viewed through a glass window 144 that is provided near the outer extremity of the tubular member 47, as indicated in Fig. 8. The window 144 is tightly sealed in the outer end of the tubular member 147 by means of suitable gaskets 145 and a flanged securing sleeve 146 that is internally screw-threaded to cooperate with corresponding external screw threads at the outer extremity of the tubular member 47. The outer surface of the flanged sleeve 146 is suitably knurled, as indicated at 147, whereby it may be tightly screwed onto the end of the member 47 to form a perfectly air-tight connection between said member 47 and the window 144. The member 47 is suitably fixed to a side wall of the tapered casing portion 43 in register with an aperture therein by means of soldering or brazing to form an air-tight connection at this point.

It will be seen from an examination of Fig. 8 that the viewing screen 142 may be clearly viewed through the window 144 when said screen is in its operative position as shown. The screen or the mounting plate therefor also serves in this position as a light-proof shutter to protect the film 130 from exposure to light entering the casing through the window 144. It will be understood, of course, that the cap or cover 47a previously mentioned with reference to Figs. 1 and 2 is used to cover the window 144 when the movements of the cathode ray or beam are being recorded on the film 130 instead of being viewed on the screen 142. This cap or cover prevents the entrance of light into the film chamber through the window 144, which light might affect the sensitized film 130. The provision of such a cap may not be necessary, however, where the window 144 is composed of colored glass which will not admit any light that will affect the film 130, but which will permit the observation of the path of movement of the cathode ray or beam as indicated on the screen 142.

The screen 142 is adapted to be actuated between its operative and inoperative positions by means of a pin 148 extending through an airtight sealing gland 149 in the end wall 113 of the film chamber 22, as shown in Fig. 1. The outer extremity of the pin 148 is provided with an operating handle 150, and the inner extremity of this pin is adapted to engage the axial portion 143 of the screen 142 in a suitable operative manner. Thus, the instrument may be adapted either for visual observation or for photographic recording of the movements of the cathode ray or beam by simply manipulating the handle 150 on the outside of the casing. It will be understood that the screen 142 is so mounted that it will remain in either of its two positions when it has been actuated into such position by the manipulation of the handle 150.

The enlarged view of Fig. 12 diagrammatically indicates the manner in which the cathode ray or beam is emitted from the filament 74 and electrostatically focused. In this figure the lines 151 indicate the electron emission from the filament 74, the electrons thus emitted passing through the relatively large central aperture 78a in the member 78 of the filament shield. An electrostatic field indicated by the lines 152 is created between the member 78 and the member 70 which constitutes the top of the negative electrode 69. This electrostatic field 152 is created by applying a suitable potential difference between the filament shield 63 and the negative electrode 69. This potential difference may be of any desired magnitude, but it has been found that a potential difference of between 100 and 2,000 volts produces the most satisfactory results. The negative electrode 69 is positively energized with respect to the filament shield 63 by means of this potential difference, the member 69 being designated as the negative electrode because it is negatively energized with respect to the positive electrode 80, as will hereinafter appear.

The electrostatic field 152 exerts a focusing and accelerating effect upon the cathode ray or beam between the filament shield and the top of the negative electrode 69 and the ray or beam is thus caused to be projected downwardly through the central aperture 70a, where it is brought to a focus, into the interior of the bell-shaped member 69. The stray or unfocused electrons which pass through the aperture 78a in the bottom of the filament shield are intercepted by the member 70, the aperture 70a therein being of such size as to permit only a relatively thin pencil of focused rays to pass therethrough.

The negative electrode 69 and the positive electrode 80 are respectively connected to the negative and positive sides of a suitable source of potential difference to create an electrostatic field between these members, as indicated by the lines 153. The magnitude of this potential difference may be varied between relatively wide limits, it having been found in actual practice that potentials varying anywhere between 300 and 20,000 volts produce satisfactory results. It will be understood, of course, that the invention is not limited to the use of any particular potential difference or range of potential differences as applied to these or any other portions of the instrument, the figures given being stated merely by way of examples.

Due to the telescoped relation of the electrodes 69 and 80, the electrostatic field 153 is caused to converge downwardly toward the positive electrode 80, as indicated by the inclination or curvature of these lines in Fig. 12. The utilization of the electrodes 69 and 80 in the relation disclosed is an important feature of the invention because it has been found that a converging field of this character exerts a strong focusing effect upon the cathode ray or beam, which is diagrammatically indicated by the lines 154. The electrons in the beam 154 start to diverge as indicated after passing through the focus at the aperture 70a and they also exert a mutually repelling effect by reason of their similar negative charges. This repelling effect would normally cause the beam to be substantially dispersed in the relatively long path of travel of the electrons. However, by utilizing the converging electrostatic field 153, as disclosed, this dispersive effect is entirely overcome, and the cathode beam 154 is accurately focused upon the film 130 or the viewing screen 142. This effect is obtained because the radial component of the field 153 imparts to the electrons constituting the cathode ray or beam a component of velocity toward the center of the beam, which radial component of velocity counteracts the dispersive momentum of the electrons caused by their mutual repelling forces during the entire length of the beam.

The extent of the focusing effect required under different operating conditions may vary considerably, and it is for this reason that the positive electrode 80 is provided with adjusting means operable by the knurled knob 88, as shown in Fig. 7 and previously described. By adjusting the knob 88 the positive electrode 80 may be raised or lowered a substantial distance to effect the exact degree of convergence of the electrostatic field 153 which will effect the necessary focusing effect upon the beam 154. This will be apparent from a consideration of the structure disclosed, since a raising of the positive electrode 80 will obviously effect such a change in the inclination of the lines of the electrostatic field 153 that the degree of convergence of these lines will be increased, and vice versa.

The focusing effect of the electrostatic field 153 may also be varied by changing the magnitude of the potential difference applied between the electrodes 78 and 70, but the degree of variation obtained by the adjustable mounting of the positive electrode 80 is such as to give a wide range of variation by this means alone, whereby it is not ordinarily necessary to change the magnitude of the voltage applied to the electrodes 78 and 70 for ordinary variations in the conditions under which the instrument is operated.

It will also be understood that the electrostatic field 153 exerts an accelerating effect upon the cathode ray or beam 154 whereby the desired velocity of this beam is obtained. The magnitude of this accelerating effect may be readily varied by varying the potential difference that is applied between the electrodes 69 and 80, so that any desired velocity of the beam may be obtained for any given operative conditions. Thus, the spacing of the electrodes 69 and 80 and the magnitude of the potential difference that is utilized therebetween may be adjusted so that both the focusing effect and accelerating effect of the field 153 may be adjusted to the proper values. With this construction, the focusing of the beam may be readily accomplished regardless of the gas pressure within the instrument, as long as this pressure is not above the necessary minimum value of, say, a few one-hundredths of a millimeter.

The method of focusing a cathode ray or beam by the use of high-voltage electrodes in adjustable telescoped relation is believed to be entirely new and is broadly claimed herein, since this method may be utilized wherever a cathode ray or beam is to be focused for any purpose, such as in a television system or elsewhere.

The beam 154, after passing through the electrostatic field 153 between the electrodes 69 and 80, passes through the central aperture 81b in the cap member 81 at the top of the positive electrode 80, and thence continues downwardly through the interior of the electrode 80, which is made hollow for this purpose. The aperture 81b is of sufficient size to permit the entire beam to pass therethrough and the inclination of the walls of said aperture is such as to prevent the electrons from striking said walls, thereby eliminating undesirable conditions, particularly heating of the members 81 and 80.

As the beam 154 continues along its downward path of travel within the positive electrode 80, any stray electrons which may be liberated from the beam are intercepted by the walls of the member 80 and are thus prevented from bombarding the interior of the insulating casing portion 25. This feature is of considerable importance because it has been heretofore considered necessary to construct such a casing portion of glass or similar material in order to withstand the high temperature caused by such stray electron bombardment. Such bombardment in instruments heretofore devised has been very considerable because widely separated electrodes establishing an accelerating field with substantially parallel lines of force have been utilized almost universally, with the result that the cathode beam diverges substantially between the cathode and anode. The use of a converging field produced by closely spaced telescoped electrodes substantially eliminates this condition in instruments constructed in accordance with the present invention, thus permitting the casing portion 25 to be made of any desired insulating material, molded or otherwise, such, for example, as phenol condensation products or the like. Such products are capable of being accurately machined and molded so that the difficulties incident to the proper construction of the instrument are greatly reduced. Moreover, the member 80 protects the beams from surface charges on the inside of the casing portion 25, and thus prevents "flickering" of the beam which might otherwise be caused by such charges.

When the beam 154 reaches the bottom of the space enclosed by the positive electrode 80 and the supporting sleeve 82 therefor, it passes through the aperture 102a in the plate 102, shown in Fig. 7. This plate intercepts the few stray electrons which may have been thrown off from the main beam 154, but substantially all of the electrons in the beam are accurately maintained in focus by reason of the above-described action of the electrostatic field 153, and the entire beam thus focused passes freely through the aperture 102a. The side walls of the aperture 102a are inclined as shown so that in case the beam is not properly centered through said aperture it will not be thrown out of focus by reason of the glancing or reflection of electrons from these walls.

The cathode ray or beam then passes between the two pairs of deflecting plates 90 and 91, and thence downwardly through the casing portion 23 to impinge upon the viewing screen 142 or the exposed portion of the film 130. An oscillating potential difference of known frequency, or a varying potential difference of which the rate of change is known or can be determined, is connected between the two plates of one of the pairs of plates 90 and 91 to cause the cathode ray or beam to be periodically oscillated or to produce a time axis or datum. Such a timing potential difference may be derived from a vacuum tube circuit, which is advantageous because it is possible thereby to apply a straight-line timing motion automatically, or may be obtained in any other suitable manner well known in the art. The two plates of the other pair of the deflecting plates 90 and 91 are connected to the circuit in which the phenomena to be observed or recorded obtain, and thus the cathode ray or beam is deflected by such phenomena in a direction perpendicular to that in which it is deflected by the timing potential difference that is connected to the other pair of plates. In this manner an indication on the screen 142 or a record on the film 130 is produced to indicate the exact nature of the phenomena under consideration.

The instrument is also adapted for the use of electro-magnetic means for deflecting the beam, which means are known in the art and generally comprise magnetic coils wound upon hollow cylindrical members of insulating material. Such a member may be secured, if desired, between the parts 104 and 105 of the instrument casing whereby the beam may be deflected magnetically instead of, or as well as, electrostatically. Such magnetic deflecting means are not ordinarily required, but may be useful for laboratory work.

The focusing effect of the electrostatic field 153 is so adjusted that the dispersive tendency of the electrons in the cathode ray or beam is counteracted to a sufficient extent to concentrate the electrons throughout the entire path of their travel and bring them to an accurate focus upon the screen 142 or film 130. Thus, the beam produces a well defined spot of high intensity on the screen or film whereby the movements of the beam are accurately reproduced thereon. In this connection it may be stated that the oxide coating on the bottom of the filament 74, and the small size of the aperture 70a, substantially eliminate all light emission from said filament in a downward direction through the several small apertures in the path of travel of the cathode ray or beam and therefore there is insufficient light reaching the film 130 from the filament 74 to have any effect upon said film except for very long exposures thereof.

The circuit diagrams shown in Figs. 13 and 14 will now be described to illustrate an application to which an instrument constructed in accordance with the present invention is particularly adapted.

Figure 13:
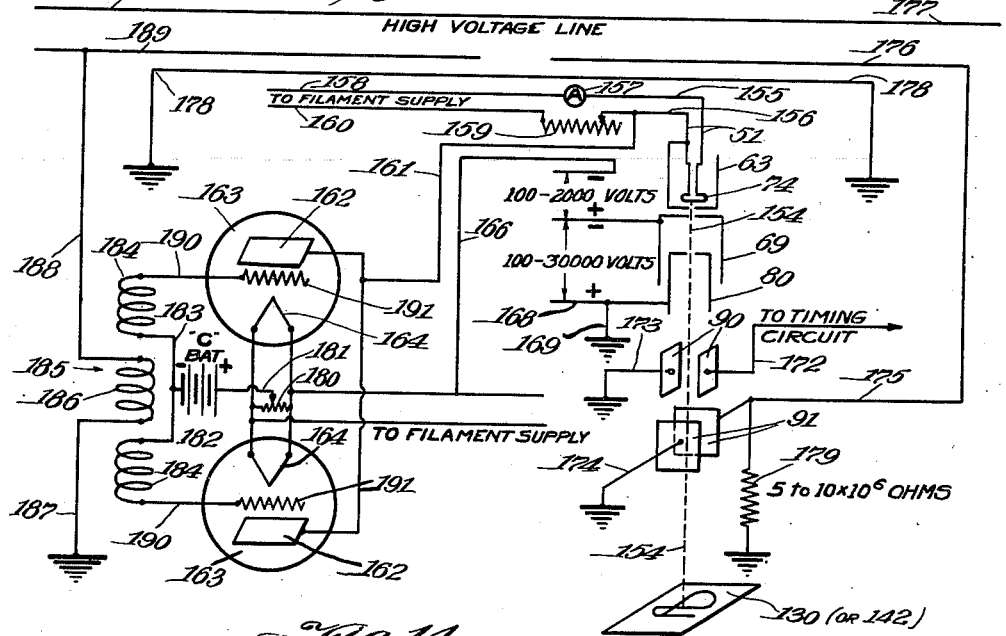
Fig. 13 is a diagrammatic representation of certain electrical apparatus and circuits, whereby an oscillograph constructed in accordance with the invention may be arranged and connected to be brought into operation automatically upon the occurrence of transient phenomena which it is desired to record.

In Fig. 13 the filament 74 is shown as being connected through its lead wires and the conductor rods 51 to conductors 155 and 156, the former of which is connected through an ammeter 157 to a conductor 158 which extends to a suitable source of current (not shown) for heating the filament. The conductor 156 is preferably connected through a variable resistor 159 to a conductor 160 which extends to the other side of the source of filament current supply. The amount of current traversing the filament 74 may thus be varied by adjusting the effective value of the resistor 159, and is indicated to the operator by the ammeter 157.

The filament shield 63 is diagrammatically illustrated as being connected to one side of the filament 74, and the same side of the filament is connected through a conductor 161 to the plates 162 of two triode electron tubes 163 which are preferably of the high vacuum type. The filaments 164 of the tubes 163 are connected in parallel with each other and are adapted to be energized from a suitable source of current (not shown) through two supply conductors 165, one of which is connected through a conductor 166 to the negative side of a source of direct current potential that is to be applied to the filament 74 and the shield 63 on the one hand, and the cathode 69 on the other hand. The positive side of this potential source, which, as is indicated on the drawings, may suitably have a value of 100 to 2,000 volts, is connected through a conductor 167 to the negative electrode 69. The conductor 167 is also adapted to connect the negative electrode 69 to the negative side of a source of relatively high direct current potential, which, for example, may be of a suitable value between 100 and 30,000 volts, as indicated on the drawings. The positive side of this high potential source is connected through a conductor 168 to the positive electrode 80 of the oscillograph, and is also preferably grounded, as indicated at 169.

The connection from the conductor 167 to the negative electrode 69 is made by means of a binding post or screw 170, which, as indicated in Figs. 1, 2 and 3, is suitably mounted on the metal casing portion 27, the lower extremity of which is in electrical contact with the negative electrode 69. The conductor 168 may be secured to any convenient point on the metallic portions of the casing of the instrument below the insulating portion 25, as, for example, to a binding post or screw 171 on the side of the metallic casing portion 24, as indicated in Fig. 7. The exact location of such a binding post or screw is immaterial because all of the portions of the casing below the insulating portion 25 are of metal and are in contact with each other, except on comparatively rare occasions when an insulating tubular section carrying a beam-deflecting electromagnet is secured between the parts 104 and 105 of the casing as above mentioned. In view of this fact the grounding of the conductor 168, as indicated at 169 in Fig. 13, is a material factor of safety for the operator, because none of the portions of the casing is electrically energized above ground potential except the upper casing portion 27, which is protected by the four insulating rod portions 32b.

One of the deflecting plates 90 is connected through a conductor 172 to a timing oscillator or other suitable source of timing potential, one form of which is described hereinafter, and the other of this pair of plates is connected through a conductor 173 to ground, to which the other side of the timing circuit will also be connected. In this manner a suitable timing potential is applied to this pair of deflecting plates, as previously described. One of the pair of deflecting plates 91 is connected through a conductor 174 to ground, while the other of this pair of plates is connected through a conductor 175 to an antenna 176 that is suitably suspended between a high-potential transmission line 177, or other conductor that is to be subjected to the phenomena under observation, and a grounded counterpoise 178. In this manner the antenna 176 is subjected to the lightning surges or other abnormal conditions occurring on the line 177 without being directly connected to said line, by reason of the disposition of the antenna in the electrostatic field between the line 177 and the counterpoise 178. If desired, the antenna 176 and counterpoise 178 may be replaced by a dividing condenser to accomplish the same result. Accordingly, an electrostatic field of varying intensity depending upon the conditions obtaining in the line 177 is created between the two deflecting plates 91. The conductor 175, antenna 176 and the plate 91 to which the conductor 175 is connected, are preferably grounded through a resistor 179 of the magnitude of 5,000,000 to 10,000,000 ohms to prevent the accumulation of an excessive static charge in this portion of the circuit.

A resistor 180 of suitable resistance value is connected in parallel relation to the filaments 164 of the two vacuum tubes 163, and an intermediate point on this resistor is connected through a conductor 181 to the positive terminal of a grid-biasing battery or "C" battery 182. The negative terminal of the battery 182 is connected to a conductor 183 extending between one terminal of each of two secondary windings 184 of a transformer 185, which is preferably of the air core type. This transformer further comprises a primary winding 186 having one of its terminals connected to ground through a conductor 187, and having its other terminal connected through a conductor 188 to a second antenna 189 that is disposed similarly to the antenna 176 between the high voltage line 177 and the grounded counterpoise 178. The outside terminals of the secondary windings 184 of the transformer 185 are respectively connected through conductors 190 to the grids 191 of the vacuum tubes 163.

With the above described connections, the grids 191 of the vacuum tubes 163 are normally negatively biased with respect to the filaments 164 by the "C" battery 182, this negative bias being transmitted through the conductor 183, the secondary windings 184 of the transformer 185 and the conductors 190 to the respective grids 191, while the positive side of the battery is connected to the filaments 164 through the conductor 181 and the balancing resistor 180. By reason of this negative grid bias in the tubes 163, the potential between the conductors 166 and 167, which must be applied to the filament 74, or its shield 63, and the negative electrode 69 to establish the cathode ray or beam 154 in the oscillograph, is cut off from the instrument because no current can flow between the conductors 161 and 166 while the grids 191 of the vacuum tubes 163 are properly or sufficiently negatively biased with respect to the filaments 164 of these tubes.

Since the beam voltage supplied through the conductors 166 and 167 is thus effectively cut off from the oscillograph by the valve action of the tubes 163, the filament 74 of the oscillograph may be continuously maintained in a heated condition and the relatively high voltage between the conductors 167 and 168, which are respectively connected to the negative electrode 69 and the positive electrode 80 to establish an accelerating and focusing electrostatic field therebetween, may be continuously connected to these electrodes so that this field is continuously maintained. The timing potential circuit, of course, may also be continuously connected across the deflecting plates 90 without having any effect upon the instrument, and the film 130 or viewing screen 142 may be maintained in operative position to record or indicate the deflections of the cathode ray or beam 154 as soon as the same is established and as long as it is maintained.

Therefore, all that it is necessary to do to place the oscillograph in operation for recording or observation of the phenomena occurring on the line 177 is to apply the proper voltage between the filament 74, or its shield 63, and the negative electrode 69. This is accomplished by means of the circuits through the vacuum tubes 163 because the negative bias on either or both of the grids 191 is overcome by the potential induced in the secondary circuits of the transformer 185 upon the occurrence of a surge in the line 177, which causes current to traverse the primary winding 186 of this transformer because this primary winding is connected between the antenna 189, disposed adjacent the line 177, and ground. The time required for establishment of the beam voltage between the filament 74, or its shield 63, and the negative electrode 69 is negligible with this arrangement and is only that required for electrostatically charging the circuit portions between which the potential is to be applied. The instrument and related circuits are so designed that their electrical capacity is extremely small, and it has been found in actual practice that the time required for building up the voltage for initiating the beam is not over one-half of one one-millionth of a second and may be as small a quarter of one one-millionth of a second. It will be readily appreciated that this amount of delay in bringing the instrument into operation is negligible in practice and will not effect a loss of any appreciable portion of the wave front of the phenomena to be recorded, even though these phenomena are of extremely short duration, as in the case of surges caused by lightning.

When the beam voltage is applied to the oscillograph in the manner described, the cathode ray or beam 154 is immediately established and is accelerated downwardly through the electrostatic field between the negative electrode 69 and the positive electrode 80, and thence downwardly between the two pairs of deflecting plates 90 and 91 to impinge upon the film 130 or the screen 142. The timing potential applied between the plates 90 causes the beam to be deflected transversely of the film or viewing screen and the electrical characteristic or phenomenon that is to be recorded or observed creates a varying electrostatic field between the two deflecting plates 91 whereby the beam is deflected in a direction normal to the direction of the timing deflection of the beam. A record or indication of the nature and extent of the phenomenon is thus accurately produced upon the film or viewing screen.

The beam is maintained as long as the initiating potential therefor is connected between the filament 74, or its shield 63, and the negative electrode 69, and this potential is applied to these portions of the instrument until both of the grids 191 of the two vacuum tubes 63 are again fully or properly negatively biased with respect to the filaments 164, since the two transformer secondary windings 184 are of opposite polarity with respect to each other to permit the establishment of the oscillograph potential circuit in response to the occurrence of a surge of either polarity with respect to the ground.

When the surge is terminated, the primary winding 186 of the transformer 185 is no longer traversed by current and the "C" battery 182 therefore again becomes effective to apply its negative bias to the grids 191 of the two vacuum tubes 163. Thus, the potential between the conductors 166 and 167 is cut off from the oscillograph just as soon as the surge or other phenomenon to be recorded or observed has terminated.

Figure 14:
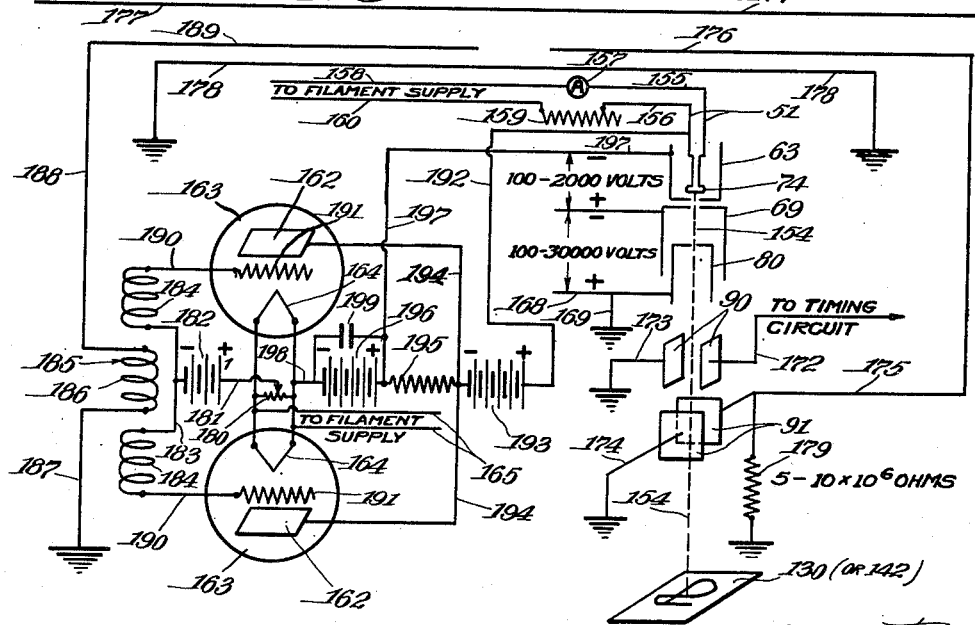
Fig. 14 is a diagrammatic representation of a modified system of circuit connections for the same purpose as the system shown in Fig. 13.

Another method whereby the oscillograph may be placed in operative condition in response to the occurrence of the phenomena to be recorded or observed is illustrated in Fig. 14, in which the several parts of the apparatus represented that are identical with parts illustrated in Fig. 13 are designated by the same reference characters that are applied to the corresponding parts in Fig. 13.

Referring to Fig. 14, it will be seen that the filament 74 is energized from a suitable supply of current through conductors 155, 156, 158 and 160 and the ammeter 157 and variable resistor 159 exactly as shown in Fig. 13. The filament shield 63, however, is not directly connected to either side of the filament 74, but is insulated from said filament in a manner heretofore referred to. This result is accomplished in the construction of the oscillograph simply by extending three of the conducting rods 51 through the insulating cap 29 of the oscillograph casing instead of utilizing only two such rods, as indicated in Fig. 4. One of the three rods 51 is connected to the filament shield 63 through the metallic sleeve member 62 exactly as indicated in Fig. 4, and the filament lead 76 is connected to another one of the rods 51 through the insulated conductor 59 as also shown in this figure. The other filament lead 75, however, instead of being connected to the metallic sleeve 62, is connected through a second insulated conductor similar to the conductor 59 to the third insulated rod 51 in a manner which will be very readily understood.

With the filament 74 and its shield 63 thus insulated from each other, it becomes possible to apply a negative bias to the shield with respect to the filament, and this is done by means of the vacuum tubes 163 in a manner similar to that in which these tubes interrupt the circuit between the conductors 161 and 166 in Fig. 13. One side of the filament 74 is connected through the corresponding conducting rod 51 and a conductor 192 to the positive terminal of a battery 193, the negative terminal of which is connected through two branches of a conductor 194 to the plates 162 of the vacuum tubes 163. The conductor 194 is also connected to one end of a resistor 195, the other end of which is connected to the positive terminal of a second battery 196 and also, through a conductor 197, to the filament shield 63. The negative terminal of the battery 196 is connected through a conductor 198 to one side of the filaments 164 of the two tubes 163. A condenser 199 is connected in parallel with the battery 196 for the purpose of by-passing any inductance which may exist in the internal connections of said battery, thereby hastening the building up of current in the tube circuits after a positive impulse has been received by the grids.

The filaments 164 are energized as in the system illustrated in Fig. 13 through the conductors 165 extending to any suitable source of filament current supply, and all of the remaining parts of the system, including the resistor 180, the "C" battery 182, the primary and secondary windings of the transformer 185, the grids 191 of the vacuum tubes 163, the antenna 189, the electrodes 69 and 80 and the deflecting plates 90 and 91 of the oscillograph, are connected in exactly the same manner as shown in Fig. 13, and, therefore, the conductors for establishing these connections are indicated by the same reference characters as in Fig. 13.

It is to be noted, however, that the voltage between the filament shield 63 and the negative electrode 69 is continuously connected to these elements by means of the conductors 167 and 197, rather than being connected through the vacuum tubes 163, since these vacuum tubes are now utilized to establish the cathode ray or beam in the oscillograph without interrupting the circuit by which this beam voltage is applied to the oscillograph. This is accomplished by normally maintianing the filament 74 at a positive potential with respect to the shield 63 (which includes the member 78). This positive potential is maintained by the battery 193, the positive terminal o which is connected directly to the filament 7 through the conductor 192 and the negative terminal of which is connected to the member 63 through the resistor 195 and the conductor 197. When a surge, or similar phenomenon to be observed or recorded, occurs on the line 177, the resultant positive energization of either or both of the grids of the tubes 163 permits current from the battery 196 and condenser 199 to traverse the resistor 195. This establishes a potential drop across the resistor 195 in opposition to the potential of the battery 193. In this manner the potential between the filament 74 and its shield 63 may be brought to zero, or, if desired, may be overbalanced to make the shield positive with respect to the filament, with the result in either case that electrons from the filament are immediately permitted to pass through the opening 78a in the shield and to establish the beam for operating the instrument.

In a system such as those shown in Figs. 13 and 14, the vacuum tubes 163 are effective to prevent the establishment of the cathode ray or beam except upon the occurrence of the abnormal conditions or phenomena on the line 177 which it is desired to record or observe. The antenna 189 may be designated as a controlling antenna, since it controls the effectiveness of the vacuum tubes 163 and through the instrumentality of these tubes causes the cathode ray or beam to be established and maintained in the oscillograph only during the occurrence of the said abnormal conditions or phenomena. The controlling antenna 189 is disposed with respect to the line 177 and the grounded counterpoise 178 in a manner similar to that in which the antenna 176 is so disposed, the latter antenna being the one from which the abnormal conditions or phenomena are transmitted to the deflecting plates 91 of the oscillograph.

It will be understood from the foregoing description that the system illustrated in Fig. 13 operates to disconnect the beam-initiating voltage from the oscillograph by interrupting the circuit between the conductors 161 and 166. The system shown in Fig. 14 accomplishes the same results by maintaining a predetermined negative bias on the filament shield 63 with respect to the filament 74, whereby this shield acts in a manner similar to that in which the grid of a triode electron tube acts to prevent the flow of current between the filament and plate when the grid is negatively biased with respect to the filament.

Figure 15:
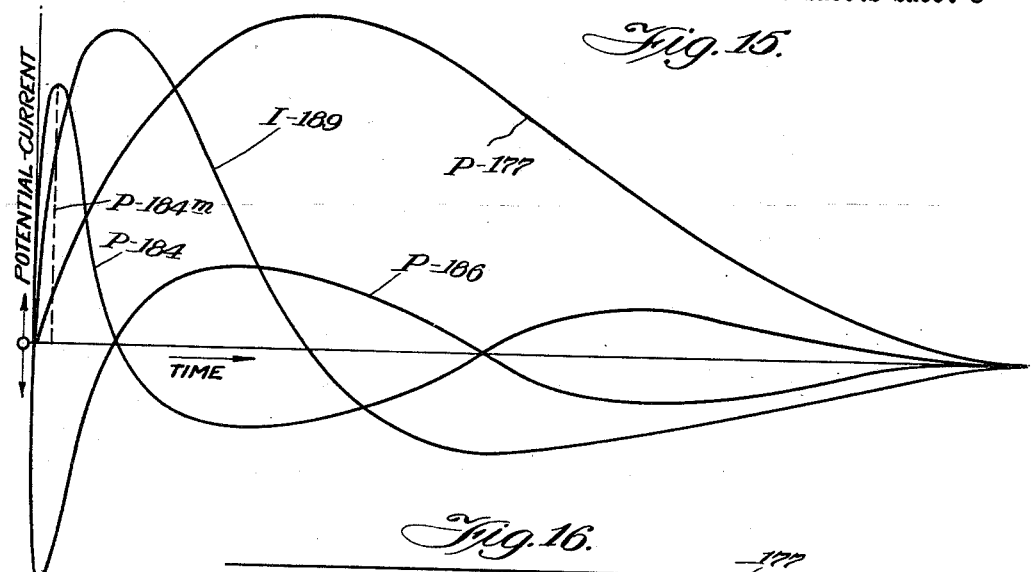
Fig. 15 is a diagrammatic representation of the phase relations of the various characteristics of the circuits shown in Figs. 13 and 14.

In order to obtain a clearer understanding of the phase relations of the potential and current characteristics of the controlling circuits of the systems illustrated in Figs. 13 and 14, reference may be had to the phase diagram of Fig. 15, in which the curve designated as P—177 indicates the surge or abnormal potential occurring upon the line 177, which potential is the one that it is desired to observe or record. The occurrence of this potential induces a potential in the controlling antenna which causes a current indicated by the curve I—189 to traverse the circuit of this antenna, which circuit includes the primary winding 186 of the transformer 185. This current is ordinarily referred to as the charging current of the controlling antenna circuit, and if the inductance of this circuit is sufficiently small, this charging will be approximately proportional to the rate of change of potential induced in the antenna 189. Since the inductance in the controlling antenna circuit is so small that the potential drop across it is small compared to the potential between the antenna and the line 177, the charging current is practically fixed with relation to the applied voltage. The potential drop across the primary winding 186 of the transformer 185 is proportional to the rate of change of current therethrough, and therefore this potential drop takes the phase position illustrated by the curve P—186. It is to be noted that while the actual magnitude of this potential drop is small compared to the surge potential P—177, it is illustrated for convenience in Fig. 15 as being of a magnitude comparable to the potential P—177.

The potential induced in the secondary windings 184 of the transformer 185 is displaced approximately 180° from the potential P—186, but the capacity load of the grid circuits and also the leakage flux of the transformer causes this potential to lag slightly behind this position. Therefore, the potential induced in the secondary windings 184, i. e., the terminal voltage of said windings, which is applied to the grids 191 of the vacuum tubes 163, occupies a phase position indicated by the curve P—184 in Fig. 15. Although the lag of the potential P—184 with respect to the potential 186 is several degrees, the relative change of phase position of the potential P—184 with respect to the surge potential P—177 is comparatively negligible. The dotted line P—184m indicates the time of occurrence of the maximum value of the potential P—184 and the intersection of this dotted line with the curve P—177 shows that only a very negligible fraction of the surge indicated by the curve P—177 has transpired at the time the grid potential P—184 reaches its maximum value. As a matter of fact, the negative bias of the grids of the vacuum tubes 163 is overcome by a much lower value of the potential line 184 than the maximum value of this potential as indicated at P—184m, and, therefore, an even smaller part of the front of the wave P—177 is lost than that indicated by the intersection of the dotted line with the curve P—177 in Fig. 15.

It should be noted that the faster the surge potential P—177 rises the faster the controlling circuits tend to establish the cathode ray or beam in the oscillograph. The actual time required for the beam to be established after the negative grid bias of the tubes 163 has been overcome depends upon the capacity of the plate circuits of these tubes and upon the saturation current of the tubes. By properly adjusting these factors this time is rendered substantially negligible.

The beam is not cut off when the potential P—184 passes through its zero point because of the energy stored in the controlling circuits by reason of their electrical capacity. Moreover, it has been found in actual practice that the grid circuits are quite likely to oscillate from shock excitation, thus causing the negative grid bias to be overcome in both of the tubes 163. This, of course, is an advantage because it accelerates the operation of these tubes in establishing the cathode ray or beam in the oscillograph.

Very soon after the surge or other phenomenon indicated by the curve P—177 has subsided, the energy stored in the controlling circuits is dissipated, and the cathode ray or beam is then cut off in response to the interruption of the circuit of the beam potential in the system shown in Fig. 13 or to the reestablishment of the negative bias of the filament shield in the system shown in Fig. 14, by reason of the action of the electron tubes 163 in either case.

In the foregoing description of the systems shown in Figs. 13 and 14, no manner of applying a timing potential to the deflecting plates 90 has been described in detail. It has been stated that these deflecting plates may be connected either to a source of oscillating potential of known frequency or to a varying potential having a known rate of change. A preferred manner of applying the timing potential to the plates 90 is disclosed in Fig. 16, the system shown in this figure also comprising apparatus and circuits for applying the timing potential automatically at the instant of occurrence of the surge or other phenomenon to be recorded or observed by the oscillograph. By utilizing this system the timing potential is automatically applied to the deflecting plates 90 at the proper time so that the entire operation of the instrument is automatically initiated to obtain the desired observation or record without requiring the exercise of any manual control.

Before describing the system illustrated in Fig. 16, the electron tube shown in Figs. 10 and 11 will be described, as this tube is of a particular type which has been found to be most advantageous in controlling the system shown in Fig. 16. Referring, then, to Figs. 10 and 11, an electron tube designated generally by the reference character 200 comprises the usual base 201 carrying a sealed glass bulb 202 which encloses the operative elements of the tube. The tube is of the triode type and therefore the operative elements thereof comprise an anode, a cathode, and a grid. The anode is constituted by a metal wire or rod 203 surrounded by an integral portion 204a of a supporting member 204 of glass or other suitable material carried within the casing 202 at the bottom portion thereof. The integral glass sleeve portion 204a projects uprightly from the top portion of the supporting member 204 and surrounds the anode 203 for its entire length, leaving only the end of the wire or rod constituting this anode exposed.

Another integral glass sleeve portion 204b projects uprightly from the supporting member 204 in the same manner as the sleeve portion 204a and similarly surrounds a metal wire or rod 205 constituting the grid element of the tube. The wire 205, however, extends beyond the upper extremity of the glass sleeve portion 204b and is bent at right angles to form a portion 205a overlying the upper extremity of the anode 203 in relatively close proximity thereto. The cathode of the tube 200 is constituted by a metal cylinder 206 which surrounds the anode 203 and the grid 205 and is supporterd by wires or rods 207 from the supporting member 204. The wires or rods constituting the anode 203 and the grid 205, as well as the wires or rods 207, are sealed into the supporting member 204 in the usual manner and extend downwardly through the base 201, within which they are electrically connected to a plurality of metallic prongs or fingers 208 which are adapted to be inserted in the usual electron tube socket provided for the purpose of supporting the tube and facilitating the making of electrical circuit connections to the elements thereof.

The container or bulb 202 of the electron tube 200 is filled with neon gas and the device thus constructed constitutes the type of tube now known in the art as the "grid-glow" tube. This particular type of tube is preferably utilized in the system shown in Fig. 16, which will be described presently, because said tube has the characteristics desired in such a system, namely, that it offers a very low impedance between the anode and cathode after current has once started to flow between these elements. This flow is initiated by applying a positive impulse to the grid and will be maintained thereafter until such current is reduced to a very low value such, for example, as less than a milliampere. If the value of this current is reduced below the critical value, the tube stops conducting and thereupon a negative charge builds up on the grid which prevents further flow of current until this negative charge is again overcome by applying another positive impulse to the grid.

In the system about to be described in connection with Fig. 16, it has been found desirable to surround the containers or bulbs 202 of the tubes 200 to be utilized in such system with a band 209 of metal foil or the like and to connect these foil bands in such manner in the system of circuit connections that an electrical potential will be maintained between the same and the cathodes 206 of the corresponding tubes. The application of this potential between the cathodes 206 and the external foil bands 209 causes a certain amount of ionization to be continuously maintained within the tubes by reason of the resultant leakage between these elements. This ionized condition prevents any time lag in the breakdown of the tubes, which breakdown occurs in response to the application of a positive impulse to the grids of said tubes.

Figure 16:
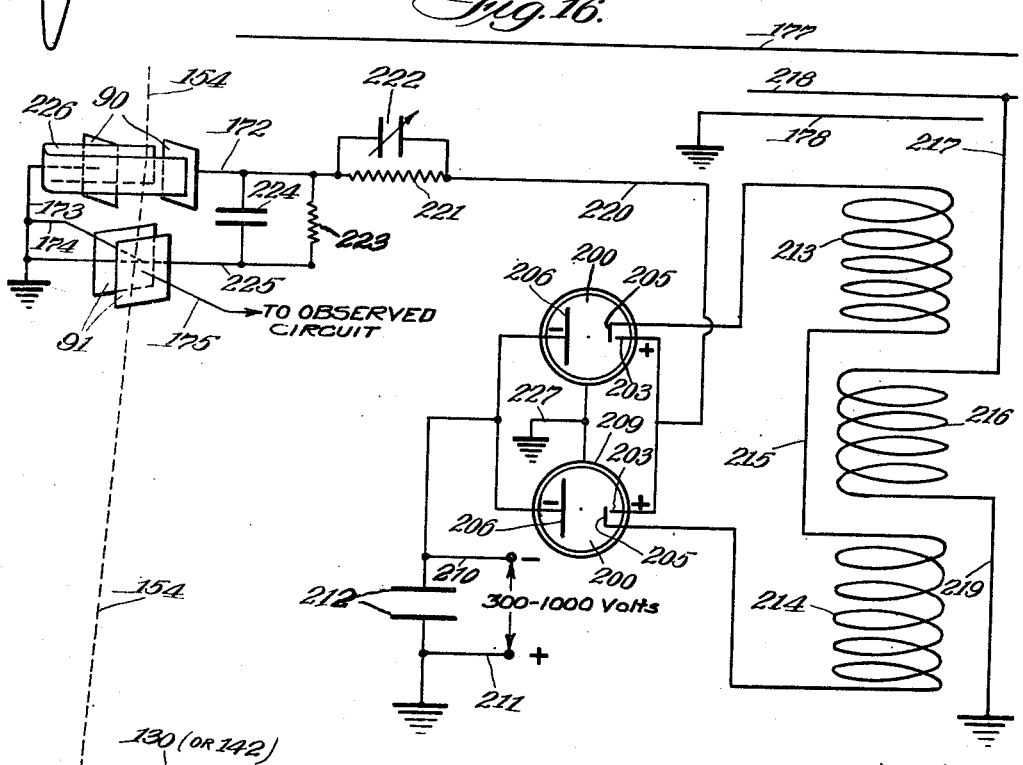
Fig. 16 is a diagrammatic representation of certain electrical apparatus and circuits for imparting a timing motion to a cathode ray or beam in an oscillograph constructed in accordance with the present invention, in a preferred manner.

Referring now to Fig. 16, it will be seen that two of the grid-glow tubes 200 are utilized, the cathodes 206 thereof being connected in common to a conductor 210 which extends to the negative side of a suitable source of direct-current potential. The value of this potential may vary with different conditions of operation but the most advantageous values have been found to be between 300 and 1,000 volts, as indicated by way of example on the drawings. The positive side of this source of potential is connected through a coiductor 211 to ground, and a condenser 212 is connected in parallel relation to said source.

The grids 205 of the two tubes 200 are respectively connected to the outer extremities of two similarly wound transformer secondary coils 213 and 214, the opposite terminals of which coils are connected together through a conductor 215. One terminal of a cooperating transformer primary winding 216 is connected through a conductor 217 to an antenna 218 that is disposed similarly to the antennae 176 and 189 heretofore referred to in connection with Figs. 13 and 14. It will be remembered that the antennae 176 and 189 were described as being suitably disposed between a high voltage power line 177 or the like and a grounded counterpoise 178 for the purpose of subjecting said antennae to electrical conditions corresponding to the conditions obtaining in the line 177, without connecting the circuits of the oscillograph directly to the high voltage line. Instead of extending to a separate antenna 218, the conductor 217 may be connected to the antenna 189 which has already been described as serving to establish the cathode ray or beam of the oscillograph in response to the occurrence of a surge or the like on the line 177. It has been found, however, that the best results are obtained by utilizing a separate antenna 218, as shown in Fig. 16, for automatically effecting the application of the timing potential to the instrument in response to the occurrence of the surge or the like that is to be observed or recorded. The circuit of the transformer primary winding 216 is completed by connecting the other terminal of said winding to ground through a conductor 219.

The anodes 203 of the electron tubes 200 are connected in common through a conductor 220 to one terminal each of a resistor 221 and of a variable condenser 222. The opposite terminals of the resistor 221 and the condenser 222 are also connected in common to place these elements directly in parallel relation to each other, and this opposite common terminal of said elements is connected to the conductor 172, which has previously been shown as extending from one of the deflecting plates 90 to the timing circuit. It will be remembered that the other one of the deflecting plates 90 is connected to ground through a conductor 173 and that one of the deflecting plates 91 is likewise connected to ground through a conductor 174. The other one of the deflecting plates 91 is connected through a conductor 175 to the circuit under observation, and it will be understood that the latter connections may be of the character disclosed in Figs. 13 and 14, although, for the sake of simplicity, the conductor 175 is simply indicated in Fig. 16 as extending to the observed circuit, the same as the conductor 172 is shown in Figs. 13 and 14 as extending to the timing circuit.

The timing system disclosed in Fig. 16 also comprises a resistor 223 and a condenser 224 that are connected in parallel relation to each other and are both connected between the conductor 172 and a conductor 225 which is connected to ground. A relatively weak permanent magnet 226 is also utilized in this system and is adapted to be disposed with its poles adjacent and straddling the deflecting plates 90, as indicated. The foil bands 209, which have been heretofore mentioned as surrounding the containers or bulbs of the electron tubes 200, are connected in common to ground through a conductor 227.

The operation of the timing system shown in Fig. 16 will now be described. Assuming that no voltage is applied to the deflecting plates 90 and 91, and the cathode ray or beam 154 is established, the latter will be held to one end of the film 130 or the screen 142 by reason of the effect on said ray or beam of the relatively weak permanent magnet 226. Upon the application of the timing potential to the deflecting plates 90 and of the characteristic to be observed upon the plates 91, the ray or beam 154 will be swept along the film 130 or screen 142 in accordance with the characteristics of the timing potential and will be simultaneously deflected transversely of the film 130 or screen 142 in accordance with the characteristic to be recorded or observed. If the timing potential and the characteristics under observation are applied to the plates 90 and 91, respectively, at the same instant, then the magnet 226 serves simply to start the path of the ray or beam 154 at one end of the film 130 or screen 142, so that the longest possible time axis is obtained.

The occurrence of a surge or the like on the line 177 will cause a corresponding potential to be applied to the deflecting plates 91 as heretofore described with respect to Figs. 13 and 14. At the same instant the timing potential will be applied to the plates 90 by reason of the action of the circuits and apparatus shown in Fig. 16. This action is initiated by the flow of current in the transformer primary winding 216, which causes the secondary windings 213 and 214 to apply a positive impulse to either or both of the grids 205 of the electron tubes 200.

The application of a positive impulse to either or both of these grids causes either one or both of the tubes 200 to break down, with the result that current flows in the timing circuit from the potential source to which the conductors 210 and 211 are connected. This flow of current is initiated instantaneously by reason of the fact that a dgree of ionization is maintained within the tubes 200 at all times in the manner previously described. This ionization is effected by reason of the connection of the foil bands 209 to ground, the positive terminal of the potential source being also connected to ground through the conductor 211 and the negative terminal of said source being directly connected to the cathodes 206 through the conductor 210. It will be seen, therefore, that the full potential of the source to which the conductors 210 and 211 are connected is continuously applied between the cathodes 206 and the foil bands 209, so that the resultant leakage between these elements will maintain the desired degree of ionization within the tubes 200.

The instantaneous operation of the system is also facilitated by the provision of the condenser 212 which is connected between the conductors 210 and 211 in parallel relation to the source. The energy stored in the condenser 212 permits current to flow instantaneously in the timing circuit without any appreciable drop in potential. It has been found in practice that a condenser having a capacity of 0.5 to 1.0 microfarad is suitable for this application, although it will be understood, of course, that these values are stated merely by way of example and may be varied as desired to produce the proper effect.

The timing circuit extends from the anodes of the tubes 200 through the conductor 220, the resistor 221 and the condenser 222 which are connected in parallel relation to each other, and the conductor 172, to one of the deflecting plates 90. The other of these deflecting plates 90, being connected to ground through the conductor 173, is at the same potential as the positive side of the source, since the latter side of the source is also connected to ground through the conductor 211. The manner of completing the timing circuit will therefore be seen, it being observed that the resistor 223 and the condenser 224 are both connected in parallel relation to the deflecting plates 90 of the oscillograph.

The flow of current in this timing circuit charges the condenser 224 and causes the voltage across said condenser, which is the same as that across the deflecting plates 90, to build up, with the result that the cathode ray or beam 154 is swept along the film 130 or screen 142. The rate of movement of the cathode ray or beam 154 in this manner is dependent upon the rate of charging of the condenser 224 and such a condenser is selected for this application that the desired rate of travel of the cathode ray or beam is obtained. It has been found in practice that the suitable capacity for the condenser 224 will usually be between 0.0001 and 0.01 microfarad, which values are, of course, stated merely by way of example.

The charging current for the condenser 224 which flows in the timing circuit traverses the resistor 221 and the variable condenser 222, which are preferably provided to produce a rapid sweep of the cathode ray or beam on the front of the wave to be observed or recorded and a slow rate the remainder of the way along the film 130 or screen 142. The condenser 222 is preferably of the variable type in order that its capacitance may be adjusted as desired. The resistor 221 may be selected to have any desired resistance value, which, for example, may suitably be between 1,000 and 1,000,000 ohms.

When the condenser 224 is fully charged, the current flowing in the timing circuit is reduced to a value determined by the resistance value of the resistor 223 which, for example, may be from 4 to 20 megohms. This resistance value may be such for any given potential that is being utilized in the timing circuit that the flow of current, after the condenser 224 is fully charged, is insufficient to maintain the electron tubes 200 in conducting condition. If such a relatively high resistance value is chosen for the resistor 223, the flow of current in the timing circuit will be interrupted by the tubes 200 as soon as the condenser 224 is fully charged, and thereupon the cathode ray or beam 154 will return to its initial position as the condenser 224 discharges through the resistor 223, thus dissipating the difference of potential beween the two deflecting plates 90 and permitting the magnet 226 to become effective again. Under these conditions the oscillograph will be ready for another operation.

For certain kinds of work, however, such, for example, as the recording of lightning surges on transmission lines, it is desirable to utilize a resistor 223 of a lower resistance value so that for the particular value of potential being utilized at the source, the current flowing in the timing circuit through the resistor 223, after the condenser 224 is fully charged, will be sufficient to prevent the circuit from being interrupted by the tubes 200. It is characteristic of these tubes that a visible glow emanates from the anode as long as the tube is conducting current, and the maintaining of the tubes under the conditions specified permits this glow to serve as an indication that the oscillograph has been operated to produce a record of a lightning surge or the like. Since such surges occur at uncertain times the attendant might not otherwise be aware of the fact that a record had been made. After observing such an indication, an attendant may cause the tubes 200 to stop conducting by momentarily interrupting the flow of current in the timing circuit, as by opening a switch (not shown) which may be located at any suitable point in the circuit. The system will then be in condition to operate automatically again in response to the occurrence of another surge or the like.

It will be understood that the value of potential utilized at the source in a system such as that disclosed in Fig. 16, and the resistance and capacitance values of the resistors 221 and 223 and the condensers 222 and 224, will be so selected that the exact desired magnitude and rate of change of the timing potential applied to the deflecting plates 90 will be obtained. These several values may be so selected that a linear time axis for the movement of the cathode ray or beam 154 is produced, or a movement of such cathode ray or beam having any other desired rate of change may likewise be produced. The numerous applications for which the oscillograph embodying the present invention is adapted render it impossible to specify that a timing potential of any one particular characteristic is always preferable to any other, but it may be stated in general that a timing potential producing a linear time axis is preferable to one producing a timing movement having sine wave characteristics such as that produced when an oscillating timing potential is utilized.

It has been found in operating a system of the above-described character for automatically applying the timing potential to one pair of deflecting plates of the oscillograph in response to the same condition that causes the characteristic under observation to be applied to the other pair of plates, that the synchronizing of the two operations is almost perfect. In fact, it is so exact that accurate records have been made of the phase relations between voltages and currents in test work with frequencies of the magnitude of a million cycles a second, by taking one oscillogram after the other. That is, where a given voltage wave can be applied to a test-piece repeatedly, a record of the voltage drop can be made on one application of the voltage and a record of the current wave can then be made on the same film on another application of the same voltage to the same test-piece.

From the foregoing explanation it will be seen that the present invention provides a cathode ray oscillograph of a very practical and efficient design whereby the instrument is adapted for a wide variety of uses. The instrument is also very rugged in its construction and is therefore well adapted for portable use. The controlling circuits for initiating and terminating the operation of the instrument for observation or recording of a given phenomenon in direct response to the initial occurrence and final termination of such phenomenon have proved to be of very great value in recording and observing lightning surges on transmission lines and the like, since the time of occurrence of these surges cannot be predicted and since it has heretofore been considered impossible to place an instrument of this character in operative condition within a sufficiently short period of time to permit the recording or observation of phenomena of such short duration. In this connection it is to be remembered that while the filament of the oscillograph is continuously heated, and the beam-accelerating and focusing field is continuously maintained while the instrument is connected in a system of this character, the cathode beam itself is not established until it is actually required. It is by reason of this feature that the instrument may be operated in the manner described, as it is impractical to maintain the beam in existence continuously for relatively long periods of time, at any instant during which the lightning surge or other phenomenon might occur since the electrons scattered from the beam would completely fog the film in a relatively short time.

While only one specific structural design of an instrument constructed in accordance with the present invention has been disclosed herein, and while only two systems of circuit connections have been disclosed for placing such an instrument in and out of operation in response to predetermined conditions, it will be readily understood by those skilled in the art that various changes and modifications in the details of construction and electrical connections may be made without departing from the spirit and scope of the invention, as set forth in the appended claims.

What is claimed as new and is desired to secure by Letters Patent of the United States is:—

1. A cathode-ray oscillograph comprising a casing adapted to be evacuated, an electron-emitting cathode, an anode, and a shield of electrical conducting material, all disposed within said casing, said shield surrounding said cathode in electrically connected relation thereto and having a hole therethrough to cause the electrons emitted from the cathode to travel in a predetermined direction only, said shield also having a plurality of holes therethrough to insure the proper evacuation of the space therewithin, but to have no effect on the direction of travel of the electrons emitted from the cathode.

2. A cathode-ray oscillograph comprising a casing adapted to be evacuated, an electron-emitting cathode, an anode, and a shield of electrical conducting material, all disposed within said casing, said shield surrounding said cathode in electrically connected relation thereto and having a hole therethrough to cause the electrons emitted from the cathode to travel in a predetermined direction only, said shield also having a plurality of holes therethrough to insure the proper evacuation of the space therewithin, and an insulating member surrounding said shield in the vicinity of said plurality of holes to prevent the emission of electrons through said plurality of holes.

3. A cathode-ray oscillograph comprising an electron-emitting cathode, an anode member through which the emitted electrons pass, and a shield of electrical conducting material surrounding the cathode and electrically connected thereto and intermediate the emitting cathode and the anode, said shield comprising a substantially tubular member and a removable cap member closing one end thereof and having a hole therethrough to cause the electrons emitted from the cathode to travel in a predetermined direction only.

4. A cathode-ray oscillograph comprising a casing and an electron gun disposed therewithin, said electron gun comprising an electron-emitting cathode, a shield surrounding the same and adapted to have electrical connections made thereto, an insulating bushing surrounding said shield and supporting the same and an externally corrugated sleeve member surrounding and supporting said bushing and having a substantially closed end constituting the positive electrode of the gun, said end of said sleeve being substantially centrally apertured to permit electrons emitted from said cathode to pass out of the gun when the oscillograph is in operation.

5. A cathode assembly for a cathode-ray oscillograph comprising a sleeve member having a longitudinally corrugated outer surface, an insulating bushing secured within said sleeve member, a tubular shield member secured within said bushing, a cathode-supporting member secured within said shield member, and a cathode carried by said supporting member.

6. A cathode assembly for a cathode-ray oscillograph comprising a sleeve member having a longitudinally corrugated outer surface, an insulating bushing secured within said sleeve member, a tubular shield member secured within said bushing, a cathode-supporting member secured within said shield member, and a cathode carried by said supporting member, said shield member having an end portion with a hole therethrough adjacent said cathode for directing the travel of electrons emitted from said cathode.

7. A cathode assembly for a cathode-ray oscillograph comprising a sleeve member having a longitudinally corrugated outer surface, an insulating bushing secured within said sleeve member, a tubular shield member secured within said bushing, a cathode-supporting member secured within said shield member, and a cathode carried by said supporting member, said shield member having an end portion with a hole therethrough adjacent said cathode for directing the travel of electrons emitted from said cathode, and said sleeve member having an end portion with a hole therethrough in alignment with the said hole in the end portion of said shield member.

8. A cathode assembly for a cathode-ray oscillograph comprising a sleeve member having a longitudinally corrugated outer surface, an insulating bushing secured within said sleeve member, a tubular shield member secured within said bushing, a cathode-supporting member secured within said shield member, and a cathode carried by said supporting member, said shield member being provided with a removable end cap having a hole therethrough adjacent said cathode for directing the travel of electrons emitted from said cathode.

9. A cathode assembly for a cathode-ray oscillograph comprising a sleeve member having a longitudinally corrugated outer surface, an insulating bushing secured within said sleeve member, a tubular shield member secured within said bushing, a cathode-supporting member secured within said shield member, and a cathode carried by said supporting member, said shield member being provided with a removable end cap having a hole therethrough adjacent said cathode for directing the travel of electrons emitted from said cathode, and said sleeve member being provided with a removable end cap having a hole therethrough in alignment with the said hole in the end cap of said shield member.

10. A cathode assembly for a cathode-ray oscillograph comprising a sleeve member having a longitudinally corrugated outer surface, an insulating bushing secured within said sleeve member, a tubular shield member adjustably secured within said bushing, a cathode-supporting member secured within said shield member, and a cathode carried by said supporting member.

11. A cathode assembly for a cathode-ray oscillograph comprising a sleeve member having a longitudinally corrugated outer surface, an insulating bushing secured within said sleeve member, a tubular shield member secured within said bushing, a cathode-supporting member adjustably secured within said shield member, and a cathode carried by said supporting member.

12. A cathode assembly for a cathode-ray oscillograph comprising a sleeve member having a longitudinally corrugated outer surface, an insulating bushing secured within said sleeve member, a tubular shield member adjustably secured within said bushing, a cathode supporting member adjustably secured within said shield member, and a cathode carried by said supporting member.

13. In a cathode-ray oscillograph, an electron-emitting cathode and a pair of electrode members respectively adapted to be positively and negatively energized for establishing an electrostatic field in the path of travel of the electrons so emitted, one of said electrode members being substantially bell-shaped and the other of said electrode members extending into the mouth of said bell-shaped electrode member to produce a converging electrostatic field for focusing the cathode ray, whereby the electron stream is shielded by said bell-shaped electrode member throughout substantially the entire distance between said electrode members.

14. A cathode-ray oscillograph comprising an electron-emitting cathode and a pair of electrode members respectively adapted to be positively and negatively energized for establishing an electrostatic field in the path of travel of the electrons so emitted, one of said electrode members being substantially bell-shaped and the other of said electrode members extending into the mouth of said bell-shaped electrode member to produce a converging electrostatic field for focusing the cathode ray, and means for adjusting the relative positions of said electrode members to vary the degree of convergence of said electrostatic field.

15. A cathode-ray oscillograph comprising an electron-emitting cathode and a pair of electrode members respectively adapted to be positively and negatively energized for establishing an electrostatic field in the path of travel of the electrons so emitted, one of said electrode members being substantially bell-shaped and the other of said electrode members extending into the mouth of said bell-shaped electrode member to produce a converging electrostatic field for focusing the cathode ray, and means for adjusting the position of said positively energizable electrode member to vary the degree of convergence of said electrostatic field.

16. A cathode-ray oscillograph comprising an electron-emitting cathode and a pair of electrode members respectively adapted to be positively and negatively energized for establishing an electrostatic field in the path of travel of the electrons so emitted, one of said electrode members being substantially bell-shaped and the other of said electrode members extending into the mouth of said bell-shaped electrode member to produce a converging electrostatic field for focusing the cathode ray, and rack and pinion means for adjusting the relative positions of said electrode members to vary the degree of convergence of said electrostatic field.

17. A cathode-ray oscillograph comprising an electron-emitting cathode and a pair of electrode members respectively adapted to be positively and negatively energized for establishing an electrostatic field in the path of travel of the electrons so emitted, one of said electrode members being substantially bell-shaped and the other of said electrode members extending into the mouth of said bell-shaped electrode member to produce a converging electrostatic field for focusing the cathode ray, and rack and pinion means for adjusting the position of said positively energizable electrode member to vary the degree of convergence of said electrostatic field.

18. A cathode-ray oscillograph comprising a casing having a substantially tubular portion, means for producing a cathode ray within said casing, a pair of electrode members respectively adapted to be positively and negatively energized for establishing an electrostatic field in the path of travel of said ray, said negatively energizable electrode member being substantially bell-shaped and secured within said casing, said positively energizable electrode member having a portion of smaller diameter than the interior of said bell-shaped negatively energizable electrode member and extending into the mouth thereof and also having a substantially cylindrical portion disposed in slidable bearing relation to the inner surface of said substantially tubular portion of said casing, a rack on one side of a longitudinally extending groove in the outer surface of said substantially cylindrical portion of said positively energizable electrode member, a pinion disposed in said groove and meshing with said rack, and a shaft for said pinion journalled in a wall of said casing and provided with a manipulating portion outside said casing.

19. A cathode ray oscillograph comprising an evacuable casing having a substantially tubular portion, means for producing a cathode-ray within said casing, a pair of electrode members respectively adapted to be positively and negatively energized for establishing an electrostatic field in the path of travel of said ray, said negatively energizable electrode member being substantially bell-shaped and comprising a perforate peripheral flange portion for securing it within said casing, said positively energizable electrode member having a portion of smaller diameter than the interior of said bell-shaped negatively energizable electrode member and extending into the mouth thereof and also having a substantially cylindrical portion disposed in slidable bearing relation to the inner surface of said substantially tubular portion of said casing and provided with a plurality of longitudinally extending grooves in its outer surface, a rack on one side of one of said grooves, a pinion disposed in said groove and meshing with said rack, and a shaft for said pinion journalled in a wall of said casing and provided with a manipulating portion outside said casing.

20. A cathode-ray oscillograph comprising an evacuable casing, means for establishing and controlling a cathode ray within said casing, including parts within said casing adapted to have electrical connections made thereto, conducting members extending into said casing for the purpose of making such connections, said conducting members being constituted by metal rods having integral projecting collar portions intermediate the ends thereof, said casing including a portion of insulating material bored to receive said rods and having a relatively large recess therein and a sub-recess concentric with each of the bores for said rods and adapted to receive the collar portions of said rods in close-fitting relation, a plug member of insulating material also bored to receive said rods and adapted to fit into said relatively large recess in said insulating casing portion, a gasket of soft rubber or similar material disposed between said plug member and the bottom surface of said relatively large recess, another gasket of similar material between the collar portion of each of said rods and the bottom of the corresponding sub-recess in said insulating casing portion, and means for securing said plug member within said relatively large recess in said insulating casing portion to cause said collar portions of said rods to be pressed firmly between said first mentioned gasket and the corresponding ones of said other gaskets whereby said casing is effectively sealed against leaks in the vacuum around said conducting members.

21. The method of focusing a cathode ray beam which comprises directing it through a converging electrostatic field and varying the degree of convergence of said field.

22. The method of focusing a cathode ray beam which comprises directing it through an electrostatic field converging in the direction of travel of the ray and varying the degree of convergence of said field.

23. A cathode ray tube having means for focusing a cathode ray beam comprising a pair of spaced anode electrodes of different internal diameters disposed in telescoped relation and adapted to be connected to a source of potential difference for establishing an electrostatic field therebetween.

24. A cathode ray tube having means for producing and focusing a cathode ray beam comprising an electron emitting cathode and a pair of spaced electrodes of different internal diameters disposed in telescoped relation and adapted to be connected to a source of potential difference relative to the cathode for establishing a converging electrostatic field therebetween.

25. A cathode ray tube having means for focusing a cathode ray beam comprising a pair of spaced electrodes disposed in telescoped relation and adapted to be connected to a source of potential difference for establishing an electrostatic field therebetween and means for varying the spacing between said electrodes to vary the degree of convergence of said field.

26. A cathode ray tube having means for focusing a cathode ray beam comprising a pair of spaced electrodes disposed in telescoped relation and adapted to be connected to a source of potential difference for establishing a converging electrostatic field therebetween and means for varying the spacing between said electrodes to vary the degree of convergence of said field.

27. A cathode-ray oscillograph comprising an evacuable casing including a plurality of connected portions, means for establishing a cathode ray beam along a predetermined path within said casing, a pair of electrodes for establishing an electrostatic field in the path of said ray beam, two of said casing portions being of metal and respectively supporting said electrodes, a third one of said casing portions being of insulating material and disposed between said two metal casing portions, and one of said electrodes being hollow and surrounding the path of the cathode ray beam substantially throughout the length of said insulating casing portion.

28. A cathode-ray oscillograph comprising an evacuable casing including a plurality of connected portions, means for establishing a cathode ray beam along a predetermined path within said casing, a pair of electrodes for establishing an electrostatic field in the path of said ray beam, two of said casing portions being of metal and respectively supporting said electrodes, a third one of said casing portions being of insulating material and disposed between said two metal casing portions, and said electrodes being hollow and disposed in telescoped relation and surrounding the path of the cathode ray beam throughout the entire length of said insulating casing portion.

29. A cathode-ray oscillograph comprising an evacuable casing including a plurality of substantially cylindrical connected portions disposed in co-axial, vertical, end-to-end relation, means for initiating a cathode ray beam within the uppermost one of said casing portions and directing the same downwardly along a path extending substantially axially of said casing portions, a substantially bell-shaped open-topped electrode member supported at the bottom of said uppermost casing portion, a plate member resting upon the top of said bell-shaped electrode member and having a substantially centrally disposed aperture therein for permitting the passage of the cathode ray beam therethrough, and a tubular electrode member adapted to be positively energized with respect to said bell-shaped electrode member, said tubular electrode member being supported at the top of a second one of said casing portions and having its upper extremity capped and extending into the mouth of said bell-shaped electrode member in spaced relation thereto, the capped upper extremity of said tubular electrode member being substantially centrally apertured to permit the passage of the cathode ray beam therethrough, a third one of said casing portions being composed of insulating material and disposed between said uppermost casing portion and said second casing portion and surrounding said tubular electrode member.

30. A cathode-ray oscillograph comprising an evacuable casing, means for establishing a cathode ray beam within said casing, two pairs of deflecting plates within said casing, a rod supporting each of said plates and extending outwardly through said casing, means for sealing said rods in axially movable and electrically insulated relation to said casing, and means outside said casing for adjusting the positions of said plates to vary the spacing between the two plates of each pair, the two rods supporting each pair of plates being co-axially disposed, and the axis of each pair of rods being substantially perpendicular to the axis of the other pair.

31. A cathode-ray oscillograph comprising a casing adapted to be evacuated, an electron-emitting cathode, an anode, and a shield of electrical conducting material, all disposed within said casing, said shield being of substantially cylindrical form surrounding said cathode and having one end closed except for a hole therethrough to cause the electrons emitted from the cathode to travel in a predetermined direction only, the space within said shield opening into the remainder of the space within the casing at points out of the line of travel of the electrons, to insure the proper evacuation of the entire casing without affecting the direction of travel of the electrons emitted from the cathode.

32. In a cathode-ray oscillograph, an electron-emitting cathode and a pair of electrode members respectively adapted to be positively and negatively energized for establishing an electrostatic field in the path of travel of the electrons so emitted, one of said electrode members being substantially tubular and open at one end and closed at the other end except for a relatively small opening permitting passage of the electrons emitted from the cathode, said closed end being between the open end and the cathode, and the other of said electrode members having a surface lying substantially in a plane perpendicular to the axis of said tubular electrode member and adjacent the open end of said tubular electrode member and farther along the path of travel of the electrons whereby a converging electrostatic field for focusing the cathode ray is produced.

33. In a cathode-ray oscillograph, an electron-emitting cathode and a pair of electrode members respectively adapted to be positively and negatively energized for establishing an electrostatic field in the path of travel of the electrons so emitted, one of said electrode members being substantially tubular and open at one end and closed at the other end except for a relatively small opening permitting passage of the electrons emitted from the cathode, and the other of said electrode members having a surface lying substantially in a plane perpendicular to the axis of said tubular electrode member and adjacent the open end of said tubular electrode member whereby a converging electrostatic field for focusing the cathode ray is produced, and whereby the electron stream is shielded by said tubular electrode member throughout substantially the entire distance between said electrode members.

34. The method of establishing and focusing a cathode ray beam which comprises providing a first electrostatic field for concentrating the electrons emitted by a cathode and then directing the electron stream through a second electrostatic field separated from the first field and of a converging nature whereby the beam is brought into sharp ultimate focus on a predetermined surface.

35. The method of establishing and focusing a cathode ray beam which comprises providing a first electrostatic field for concentrating the electrons emitted by a cathode and then directing the electron stream through a second electrostatic field linearly additive to the first field but separate therefrom and of a converging nature whereby the beam is brought into sharp ultimate focus on a predetermined surface.

36. The method of establishing and focusing a cathode ray beam which comprises providing a first electrostatic field through which the electrons emitted by a cathode are passed in a direction from the negative terminal to the positive terminal of said field for concentrating the electrons into a beam, and then directing said beam through a second electrostatic field in a direction from the negative terminal to the positive terminal thereof, said second field being of a converging nature whereby the beam is brought into sharp ultimate focus on a predetermined surface.

ROSCOE HENRY GEORGE.